United States Patent
Saunders et al.

(10) Patent No.: US 7,457,295 B2
(45) Date of Patent: Nov. 25, 2008

(54) RADIO COMMUNICATION SYSTEM EMPLOYING SPECTRAL REUSE TRANSCEIVERS

(75) Inventors: R. Brent Saunders, Indian Harbour Beach, FL (US); Thomas F. Smaidris, Melbourne, FL (US); Edward Carl Gerhardt, Malabar, FL (US); William R. Highsmith, Indialantic, FL (US); Gregory M. Powell, Longwood, FL (US); David M. Odom, Altamonte Springs, FL (US); Larry W. Koos, Sanford, FL (US)

(73) Assignee: Adapt4 LLC, Melbourne, FL (US)

( * ) Notice: Subject to any disclaimer, the term of this patent is extended or adjusted under 35 U.S.C. 154(b) by 840 days.

(21) Appl. No.: 10/730,753

(22) Filed: Dec. 8, 2003

(65) Prior Publication Data

US 2004/0142696 A1    Jul. 22, 2004

Related U.S. Application Data

(60) Provisional application No. 60/432,223, filed on Dec. 10, 2002.

(51) Int. Cl.
    *H04L 12/28* (2006.01)
    *H04L 12/54* (2006.01)
(52) U.S. Cl. .......... 370/395.21; 370/322; 370/342; 370/343; 370/341; 370/395.41; 370/436; 370/437; 370/468; 370/477; 455/450; 455/445; 455/436
(58) Field of Classification Search .......... None
    See application file for complete search history.

(56) References Cited

U.S. PATENT DOCUMENTS 4,578,815 A * 3/1986 Persinotti .............. 455/15
5,040,238 A    8/1991 Comroe et al. .......... 455/33
5,475,677 A    12/1995 Arnold et al. .......... 370/29
5,475,866 A    12/1995 Ruthenberg .......... 455/33.1
5,640,442 A *  6/1997 Fitzgerald et al. .......... 340/7.21
5,901,357 A *  5/1999 D'Avello et al. .......... 455/454
5,999,818 A    12/1999 Gilbert et al. .......... 455/446
6,301,481 B1 * 10/2001 Parra .......... 455/450
6,304,756 B1 * 10/2001 Hebeler et al. .......... 455/450

(Continued)

OTHER PUBLICATIONS

Cherubini, Giovanni, *Filtered Multitone Modulation for Very High-Speed Digital Subscriber Lines*, IEEE, vol. 20, No. 5, Jun. 2002, pp. 1016-1028.

(Continued)

*Primary Examiner*—Raj K Jain
(74) *Attorney, Agent, or Firm*—Feldman Gale PA; Michael C. Cesarano

(57) ABSTRACT

A spectral reuse transceiver-based communication system conducts communications between a master site and a plurality of remote sites using a selected portion of a communication bandwidth containing a plurality of sub-bandwidth channels. Each remote site transceiver monitors the communication bandwidth for activity on the sub-bandwidth channels, and informs a master site transceiver which sub-bandwidth communication channels are absent communication activity and therefore constitute clear channels. The master site transceiver compiles an aggregate list of clear channels from all the remote sites and then broadcasts the aggregate list to the remote sites. The master site and a remote site then conduct communications therebetween by frequency-hopping and/or orthogonal frequency multiplexing among the clear channels using an a priori known PN sequence.

18 Claims, 18 Drawing Sheets

U.S. PATENT DOCUMENTS

| | | | | |
|---|---|---|---|---|
| 6,324,184 | B1* | 11/2001 | Hou et al. | 370/468 |
| 6,801,775 | B1* | 10/2004 | Gibbons et al. | 455/450 |
| 2002/0002052 | A1 | 1/2002 | McHenry | 455/447 |
| 2002/0085503 | A1 | 7/2002 | Hulyalkar et al. | 370/252 |
| 2003/0050012 | A1 | 3/2003 | Black et al. | 455/62 |
| 2003/0181213 | A1 | 9/2003 | Sugar et al. | 455/454 |
| 2003/0198200 | A1* | 10/2003 | Diener et al. | 370/329 |
| 2004/0047324 | A1 | 3/2004 | Diener | 370/338 |
| 2004/0077366 | A1 | 4/2004 | Panasik et al. | 455/514 |

OTHER PUBLICATIONS

Vangelista, Lorenzo, *Efficient Implementations and Alternative Architectures for OFDM-OQAM Systems*, IEEE members, pp. 1-15.
Dick, Chris, *Implementation of FPGA Signal Processing Datapaths for Software Defined Radios*, Communications Design China, Conference Proceedings, pp. 241-247.
Andraka, Ray, *A Survey of CORDIC Algorithms for FPGA Based Computers*, Andrake Consulting Group, 10 pages.
Moonen, Marc, *Per Tone Equalization for DMT Receivers*, Globecom, Rio de Janeiro, Brazil, Dec. 1999, 6 pages.
Wang, Kai, *Time and Frequency Synchronisation in OFDM*, School of Communications and Informatics, Victoria University, Melbourne, Australia, 2 pages.
Zhou, Shengli, *Finite-Alphabet Based Channel Estimation for OFDM and Related Multicarrier Systems*, IEEE, vol. 49, No. 8, Aug. 2001, pp. 1402-1414.
Lee, Donghoon, *A New Symbol Timing Recovery Algorithm for OFDM Systems*, IEEE, 1997, pp. 366-367.
van de Beek, Jan-Jaap, *ML Estimation of Time and Frequency Offset in OFDM Systems*, IEEE, vol. 45, No. 7, Jul. 1997, pp. 1800-1805.
Wyglinski, Alexander M., *Adaptive Filterbank Multicarrier Wireless Systems for Indoor Environments*, Proc. 56th IEEE Vehicular Tech Conf. (Vancouver, BC), Sep. 2002, pp. 336-340.
Saulnier, Gary J., *Performance Of An OFDM Spread Spectrum Communications System Using Lapped Transforms*, IEEE, 1997, 5 pages.
Vaidyanathan, P. P., *Filter Banks in Digital Communications*, Dept. of Electrical Engineering, California Institute of Technology, Pasadena, CA, 23 pages.
Ohm, Michael, *Extended Lapped Transforms for Digital Multicarrier Modulation*, Globecom, IEEE 25-29, Nov. 2001, pp. 217-221.
Saulnier, Gary J. *Performance of a Spread Spectrum OFDM System in a Dispersive Fading Channel with Interference*, IEEE, 1998, 5 pages.
Weiss, Stephan, *Fast Implementation of Oversampled Modulated Filter Banks*, Dept. of Electronics, University of Southhampton, 4 pages.
Weiss, Stephan, *Analysis and Fast Implementation of Oversampled Modulated Filter Banks*, Dept. of Electronics, University of Southhampton, 12 pages.
Eneman, Koen, *Para-Unitary Filter Bank Design for Oversampled Subband Systems*, Dec. 1997, rev. Jul. 1998, 31 pages.
Govardhanagiri, Subbarao, *Performance Analysis of Multicarrier Modulation Systems Using Cosine Modulated Filter Banks*, IEEE, 1999, pp. 1405-1408.
*Filtered Multitone Modulation*, IBM Europe, 14 pages.
Schuller, Gerald, *Modulated Filter Bank with Arbitrary System Delay: Efficient Implementations and the Time-Varying Case*, IEEE, vol. 48, No. 3, Mar. 2000, pp. 737-748.
Karp, Tanja, *Modified DFT Filter Banks with Perfect Reconstruction*, IEEE, vol. 46, No. 11, Nov. 1999, pp. 1404-1414.
Heller, Peter, *A General Formulation of Modulated Filter Banks*, IEEE, vol. 47, No. 4, Apr. 1999, pp. 986-1002.
Harteneck, Moritz, *Design of Near Perfect Reconstruction Oversampled Filter Banks for Subband Adaptive Filters*, IEEE, vol. 46, No. 8, Aug. 1999, pp. 1081-1085.
Treichler, J. R., *Practical Implementations of Blind Demodulators*, Applied Signal Technology, Inc. 5 pages.
Knapp, Steven, *Using Programmable Logic to Accelerate DSP Functions*, Xilinx, Inc. 1995, pp. 1-8.
Andraka, Ray, *High Performance Digital Down-Converters for FPGAs*, pp. 48-51.
Doan Vo, Nguyen, *Optimal Interpolators for Flexible Digital Receivers*, McGraw University, 4 pages.
Dick, Chris, *FPGA Interpolators Using Polynomial Filters*, 8th International Conference, Sep. 13-16, 1998, 5 pages.
Barbarossa, Sergio, *Channel-Independent Synchronization of Orthogonal Frequency Division Multiple Access Systems*, IEEE, vol. 20, No. 2, Feb. 2002, pp. 474-486.
Speth, Michael, *Frame Synchronization of OFDM Systems in Frequency Selective Fading Channels*, 5 pages.
Müller, Stefan, *Comparison of Preamble Structures for Burst Frequency Synchronization*, Globecom, San Francisco, CA, Nov. 2000, pp. 1488-1493.
DesBrisay, Greg, *Basics of Orthogonal Frequency Division Multiplexing (OFDM)*, Cisco Systems, Inc., 2000, pp. 1-42.
Zhou, Shengli, *Digital Multi-Carrier Spread Spectrum Versus Direct Sequence Spread Spectrum for Resistance to Jamming and Multipath*, IEEE, vol. 50, No. 4, Apr. 2002, pp. 643-655.
Lambrette, Uwe, *Techniques for Frame Synchronization on Unknown Frequency Selective Channels*, 5 pages.
Classen, Ferdinand, *Frequency Synchronization Algorithms for OFDM Systems Suitable for Communication Over Frequency Selective Fading Channels*, IEEE, 1994, pp. 1655-1659.
Keller, Thomas, *Orthogonal Frequency Division Multiplex Synchronization Techniques for Frequency-Selective Fading Channels*, IEEE, vol. 19, No. 6, Jun. 2001, pp. 999-1008.
Gardner, Floyd, *A BPSK/QPSK Timing-Error Detector for Sampled Receivers*, IEEE, vol. COM-34, No. 5, May 1986, pp. 423-429.
Johansson, Stefan, *Silicon Realization of an OFDM Synchronization Algorithm*, Department of Applied Electronics, Sweden, 4 pages.
van de Beek, Jan-Jaap, *Low Complex Frame Synchronization in OFDM Systems*, IEEE 1995, pp. 982-986.
Schafhuber, Dieter, *Pulse-Shaping OFDM/BFDM Systems For Time-Varying Channels: ISI/ICI Analysis, Optimal Pulse Design, and Efficient Implementation*, Vienna University of Technology, 5 pages.
Pfletschinger, Stephan, *Optimized Impulses for Multicarrier Offset-QAM*, Globecom, IEEE 25-29, Nov. 2001, vol. 1, p. 207-211.
Landström, Daniel, *Time and Frequency Offset in OFDM Systems Employing Pulse Shaping*, IEEE, 1997, pp. 278-283.
Vahlin, Anders, *Optimal Finite Duration Pulses for OFDM*, IEEE, vol. 44, No. 1, Jan. 1996, pp. 10-14.
van de Beek, Jan-Jaap, *Synchronization of a TDMA-OFDM Frequency Hopping System*, IEEE 1998, 6 pages.
Zyren, Jim, *Tutorial on Basic Link Budget Analysis*, Intersil, Jun. 1998, pp. 1-8.
Gardner, Floyd M. *Interpolation in Digital Modems—Part I: Fundamentals*, IEEE, vol. 41, No. 3, Mar. 1993, pp. 501-507.
Erup, Lars, *Interpolation in Digital Modems—Part II: Implementation and Performance*, IEEE, vol. 41, No. 6, Jun. 1993, pp. 998-1008.
Moonen, Marc, *Digital Signal Processing II—Lecture 7: Maximally Decimated Filter Banks Oversampled Filter Banks*, pp. 1-40.
Li, Jian, *Carrier Frequency Offset Estimation for OFDM-Based WLANs*, IEEE, vol. 8, No. 3, Mar. 2001, pp. 80-82.
Larsson, Erik G., *Joint Symbol Timing and Channel Estimation for OFDM Based WLANs*, IEEE, vol. 5, No. 8, Aug. 2001, pp. 325-327.
Miaoudakis, Andreas, *An All-Digital Feed-Forward CFO Cancellation Scheme for Hiperlan/2 in Multipath Environment*, IEEE 2002, 5 pages.
Müller, Stefan H., *Comparison of Preamble Structures for Burst Frequency Synchronization*, Globcom, San Francisco, CA, Nov. 2000, pp. 1488-1493.
Ma, Xiaoli, *Non-Data-Aided Frequency-Offset and Channel Estimation in OFDM and Related Block Transmissions*, IEEE 2001, pp. 1866-1870.
Pompili, Massimiliano, *Channel-Independent Non-Data Aided Synchronization of Generalized Multiuser OFDM*, IEEE 2001, pp. 2341-2344.
Kim, Ki Yun, *Symbol Frame Synchronization Technique for OFDM Burst Mode Transmission*, Sungkyunkwan University, 4 pages.
Kim, Yun Hee, *An Efficient Frequency Offset Estimator for OFDM Systems and Its Performance Characteristics*, IEEE, vol. 50, No. 5, Sep. 2001, pp. 1307-1312.

Langfeld, Patrick, *OFDM System Synchronization for Powerline Communications*, University of Karlsruhe, 8 pages.

Gallardo, Ana, *A Preamble Based Carrier Frequency Estimation Approach for B-FWA OFDM Systems*, Advanced Modulation and Coding Area, Development Programmes Department, Greece, 5 pages.

van de Beek, Jan-Jaap, *A Time and Frequency Synchronization Scheme for Multiuser OFDM*, IEEE, vol. 17, No. 11, Nov. 1999, pp. 1900-1914.

Tufvesson, Fredrik, *Time and Frequency Synchronization for OFDM using PN-Sequence Preambles*, IEEE Vehicular Technology Conference, Amsterdam, The Netherlands, Sep. 1999, pp. 1-5.

Tufvesson, Fredrik, *Time and Frequency Synchronization for BRAN using PN-Sequence Preambles*, Radio Science and Communication, Karlskrona, Sweden, Jun. 14-17, 1999, pp. 1-5.

Litwin, Louis, *The Principles of OFDM*, RF Signals Processing, Jan. 2001, pp. 30-48.

* cited by examiner

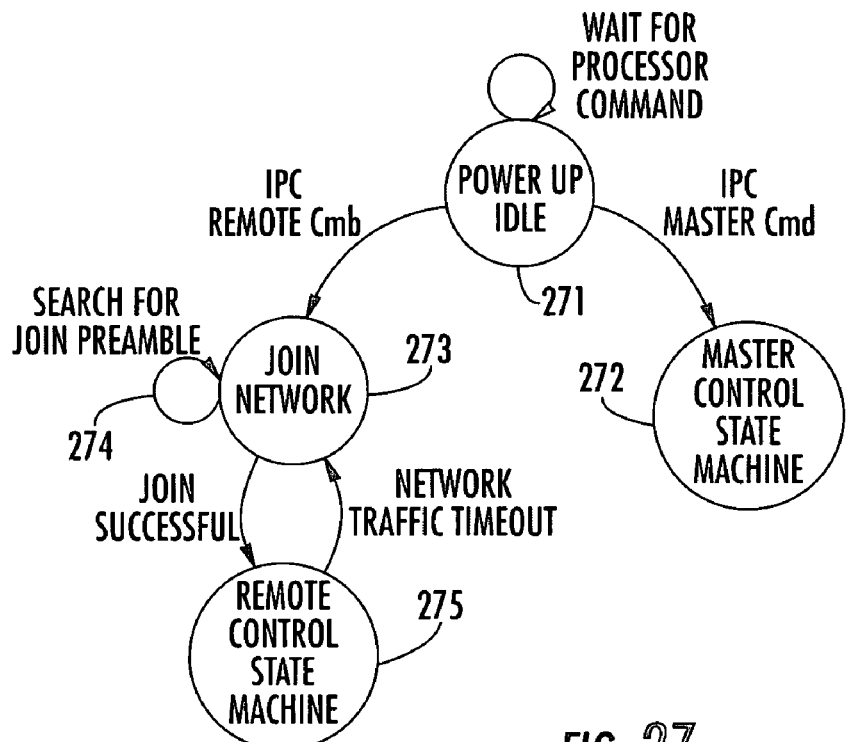
FIG. 27
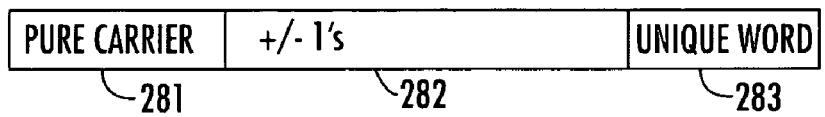
FIG. 28
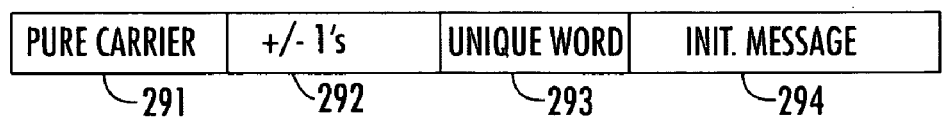
FIG. 29
FIG. 30
| MULTICARRIER 5 SYMBOLS (TICKLER) |
FIG. 31

RADIO COMMUNICATION SYSTEM EMPLOYING SPECTRAL REUSE TRANSCEIVERS

CROSS-REFERENCE TO RELATED APPLICATION

The present invention claims the benefit of co-pending U.S. application Ser. No. 60/432,223 filed Dec. 10, 2002, by Edward Gerhardt et al, entitled: "Link Utilization Mechanism for Secondary Use of a Radio Band," assigned to the assignee of the present application and the disclosure of which is incorporated herein.

FIELD OF THE INVENTION

The present invention relates in general to communication systems, and is particularly directed to a link utilization control mechanism for secondary users in a licensed band, or users in an unlicensed band, which employs a spectral reuse transceiver (SRT) operating with a selectively filtered form of orthogonal frequency division multiplexing (OFDM) for producing non-interfering radio channels, particularly, VHF and UHF radio channelized communications bands.

BACKGROUND OF THE INVENTION

In some radio bands, for example, the 217-220 MHz VHF band, the U.S. Federal Communications Commission (FCC) grants non-exclusive primary licenses use of the band for various communication services, such as push-to-talk voice. Primary users (or PUs) pay for these non-exclusive rights with the expectation that they will not suffer interference by other users. The FCC also allows secondary users (or SUs) to use the same band and the same channel within the band on a 'non-interfering' or secondary basis. Namely, so long as the primary user is not using a channel within the band, a secondary user may use it. Similar policies are also practiced by frequency management authorities in foreign countries.

The FCC and similar agencies in foreign countries are anxious to find ways to enable expanded use of such radio frequency bands, without reducing the quality of service available to the licensed primary users. For secondary users, this band—and other similar bands—represent a cost-free band with excellent radio transmission properties for telemetry and other uses. Because secondary users must not interfere with primary users, complaints of interference from a primary user to the FCC may result in an administrative order from the FCC requiring that the secondary user move to another portion of the band or leave the band entirely.

This movement can be disruptive to the secondary user's service and can be expensive, especially if site visits, equipment modification, or exchange is required to implement the change. Therefore, a mechanism is needed by which a secondary-use radio may employ the band on a non-interfering basis and which will adapt the radio's frequency usage should new primary users appear. It should be noted that primary users (who are licensed) always have priority over secondary licensed users or secondary unlicensed users; there is no first-use channel frequency right for secondary users.

Interference within such a band can occur in at least two ways. First, the primary user and one or more secondary users may have occasion to use the same channel and significantly disrupt one another. Secondly, one or more secondary users may transmit briefly with enough power and for a sufficient duration to cause some unwanted effect on the primary user's radio, such as a burst of noise through it's speaker or loss of data. Both of these and other types of interference must be avoided.

Primary users typically are field personnel who use an assigned channel for occasional voice transmissions to coordinate their activities with a central site or with co-workers in a nearby locale. It is likely that band usage will increase in the future. The aforementioned disruption of service caused by the appearance of new primary users warrants the need for a communication technique that will effectively avoid interference by secondary users.

Because of the occasional use of the band by primary users, it has been difficult to directly observe what frequencies are being used. It has also been difficult to coordinate frequency use by monitoring applications for primary use because of administrative delays. A further difficulty is that manual coordination must be done continuously, since new primary users may appear at any time.

One currently employed approach for having secondary users share a frequency band is to use manual frequency coordination. In accordance with this scheme, an installer or maintainer of a secondary user of a narrowband or wideband radio selects a frequency that appears not to be used, and then manually adjusts the radio through physical controls, or through a management control channel (in-band or out-of-band). The frequency selection process is typically performed by examining primary user license applications, or through the use of an instrumented spectral survey. The installer or maintainer then selects a frequency with sufficient, contiguous unused bandwidth to support the application. One problem with this approach is that it is labor-intensive, and it is difficult to differentiate between primary users and other secondary users.

An additional problem with this frequency selection process is that a primary user may appear only occasionally or a new primary user may appear unexpectedly. Without a further means of frequency coordination, the secondary user may interfere with the primary user and become subject to an administrative order to change the frequency or exit the band, as noted above. Another problem with this approach is that, in a busy band, it may become difficult to find enough contiguous bandwidth to support a given application. Moreover, adapting manual frequency radios to new services that require different or varying bandwidths may be difficult or expensive, depending on how bandwidth of the radio is adjusted.

Another technique for frequency coordination is to monitor applications for primary use licenses. This solves the difficulty of differentiating primary users from secondary users, but suffers all the other problems associated with human monitoring of spectrum through instrumentation, described above.

A further approach for allowing secondary users to share a frequency band is through the use of agile frequency, narrowband or wideband radios with automatic frequency coordination. This type of radio automatically detects interference from other radios and adjusts its frequency. For example, if the radio detects a high bit error rate for a sustained period, it may begin scanning for other, available frequencies or use prescribed alternate frequencies. While this constitutes an improvement over manual frequency coordination processes, it suffers from some of the same issues associated with manual frequency coordination. For example, it may be difficult to find contiguous bandwidth for the application, it may be difficult to distinguish between primary and secondary users, or it may be difficult to adapt the radio to new services that require different or varying bandwidths. Another problem with this approach is that it interferes with primary users during the interference detection phase and possibly during the frequency change phase, depending upon implementation.

Still another approach for enabling secondary users to share a frequency band with primary users is through the use of a frequency hopping spread spectrum (FHSS) radio. This type of radio spreads the transmission over a very wide band via frequency hopping with low spectral density. The radio occupies the entire band, but operates at a level sufficiently close to the noise floor to minimize the effect that the transmission will have on narrowband or wideband radios. Such a radio intends to solve the frequency coordination problem of manual frequency or agile frequency radios described above, and has the added benefit of coding gain.

However, a problem with this type of radio is the fact that the spread spectrum modulation can produce unknown effects on narrowband and wideband radios, such as possible squelch circuit activation or other types noise caused by interference. Another problem is that above 1 GHz (such as in the 2.4 GHz band), it may be difficult to close the radio link at the distances needed for many applications, such as telemetry using cost-effective radio equipment. Another problem is that when two secondary (licensed/unlicensed) users are communicating, there may be a higher-powered, interfering primary user that is closer to the secondary user transmitter than the intended secondary user receiver. In this case, the power in the FHSS signal must be increased to overcome the strong interference, which increases interference to the primary user, and decreases the jamming margin. (This latter problem is often referred to as the 'near/far' problem.) An additional problem is the fact that FHSS inherently occupies all channels, including primary user channels; therefore, it is not clear how the Federal Communications Commission in the United States, and equivalent authorities in foreign countries, will view FHSS for secondary use.

SUMMARY OF THE INVENTION

In accordance with the present invention, the problem of how to allocate secondary usage of a licensed radio frequency band (e.g., the 217-220 MHz band comprised of 480-6.25 KHz sub-bands or channels), in a manner that will not interfere with other (primary) users is successfully addressed by a new and improved spectral activity-based link utilization control mechanism and efficient modem algorithm. Pursuant to this mechanism, each site contains a spectral reuse transceiver, that operates with a selectively filtered form of orthogonal frequency division multiplexing for producing a sub-set of non-interfering radio channels, particularly, VHF and UHF radio channelized communications bands.

The spectral reuse-based communication network of the invention is that of a star-configured system, wherein a spectral reuse transceiver installed at a master or hub site communicates with spectral reuse transceivers installed at multiple remote sites. The master site's spectral reuse transceiver may employ an omnidirectional antenna, so that the master site may communicate with any of the remote site spectral reuse transceivers, while each remote site spectral reuse transceiver may employ a directional antenna whose boresight axis is pointed toward the master site.

Pursuant to the invention, the master site spectral reuse transceiver periodically initiates a clear channel assessment routine, in which the master site and each of the remote sites participate. This routine is used to compile an aggregate list of non-interfering or 'clear' channels (e.g., a plurality of 6.25 KHz wide channels) that may be employed by participants of the network. By transmitting on only what has been previously identified as a clear channel, a respective site's spectral reuse transceiver is ensured that it will not interfere with any primary user of the (3 MHz wide) band of interest.

Except when it is transmitting a message to the master site, each remote user site sequentially steps through and monitors a current list of clear channels (that it has previously obtained from the master site), in accordance with a pseudo random hopping sequence that is known a priori by all the users of the network, looking for a message that may be transmitted to it by the master site transceiver.

When a remote site transceiver is not transmitting, it is listening for ticklers from the master SRT. This does not require a sequential stepping through the clear channel list. The position of the tickler carriers is known a priori and are derived from the clear channel list. The only time that the remote site's transceiver sequentially steps through the channels is either during clear channel assessment or during the join (network discovery) process.

During the preamble period of any message transmitted by the master site, each remote site's transceiver scans all 480-6.25 KHz frequency bins within the 217-220 MHz spectrum for the presence of energy. Any bin containing energy above a prescribed threshold is marked as a non-clear channel, while the remaining channels of the 480 possible are identified as clear channels.

The master site transceiver then sequentially interrogates each remote site transceiver for its clear channel list via a clear channel request message. In response to receiving a clear channel request message, a respective remote site transceiver transmits back to the master site transceiver the clear channel list it obtained as it scanned the 3 MHz band during the preamble portion of the master site's message. Once the master site has completed its interrogation of all the remote sites, it logically combines all of the clear channel lists it has received from all the interrogated remote sites, to thereby produce an 'aggregate' clear channel list. This aggregate clear channel list is stored in the master site's transceiver and is broadcast to all of the remote sites over a subset of the clear channels that is selected in accordance with a PN sequence through which clear channels are selectively used among the users of the network. The aggregate clear channel list is normally transmitted to the remotes using the normal multi-carrier frequency hopping transmission. Only the initialization message will transmit the clear channel list in a single-carrier fashion. When the aggregate clear channel list is received at a respective remote site it is stored in its transceiver.

A synchronization function is carried out in both the master and remote transceivers and ensures that the endpoint radios are synchronized to a common set of the clear channel list, channel hopping sequence, and preamble channel. A remote transceiver determines a lack of network synchronization by an absence of received network messages. Primarily, a remote transceiver will use the expected periodic aggregate clear channel list as a network "heartbeat." The remote transceiver will also maintain a counter indicating the amount of time elapsed from the last network message received. Then based upon the activity level of these two indicators, the remote transceiver will determine whether it is. properly synchronized with the network. If the remote transceiver determines that it is not properly synchronized, it will fall into the normal initialization sequence for an uninitialized node. In the special case that a remote transceiver detects a primary user on the preamble channel, the remote transceiver will send a message to indicate the conflict such that the master transceiver can indicate to the remaining remote transceivers to fall back to the next preamble channel candidate based on a predetermined algorithm. The remote transceiver will then switch to the next preamble candidate as well. In the case where the master transceiver detects a primary user on the preamble channel, it will initiate the switch to the next preamble channel candidate by sending a message indicator to all remote transceivers. Those transceivers not in conflict with the primary user will receive the message and switch. Those remote transceivers that are in conflict will likely be unable to receive the message and will ultimately time out and declare a loss of network synchronization. At this point they will initiate the normal initialization sequence.

In order to enable the master and remote sites to successfully communicate with one another over 'clear' secondary use channels in the manner described above, the master and remote users employ a spectral reuse transceiver architecture, that operates using a selectively filtered form of orthogonal frequency division multiplexing for producing a sub-set of non-interfering (6.25 KHz) channels. The spectral reuse transceiver of the invention includes a transmit signal processing path and a receive signal processing path.

In the transmit path through the spectral reuse transceiver, a respective digital data packet from a data communication source is interfaced with a front end packet buffer. As digital data is read out from the packet buffer it is initially subjected to forward error correction, as by way of a Viterbi encoder, and then coupled to a modulator. Pursuant to a non-limiting, but preferred embodiment of the invention, the data modulation scheme is differential quaternary phase shift keyed (DQPSK) modulation. DQPSK has been chosen as a preferred modulation, since it avoids the need for carrier phase lock and non-coherent demodulation can be used. Also, in an OFDM system, phase uncertainty can be caused by either carrier phase offset or sample timing offset. A sample timing offset produces a phase offset on the carriers that is linearly increasing with the carrier number. DQPSK relieves some of the sample timing synchronization requirements. In addition, synchronization in most OFDM systems utilize pilot carriers during acquisition and tracking. It is preferable not to use such techniques in the spectral reuse transceiver of the present invention, which frequency hops only a limited number of data bearing carriers. This makes synchronization more complex. DQPSK removes these problems.

In-phase (I) and quadrature phase (Q) outputs of the DQPSK modulator are coupled to a symbol mapper. The symbol mapper maps the I and Q data from the modulator into appropriate 'clear' channel carrier(s) using a prescribed hopping PN sequence known a priori to all the users of the network. The clear channel map is a compilation of all currently 'not being used', or 'clear' channels within the band of interest, namely which of the 480-6.25 KHz spaced channels that make up the band from 217 MHz to 220 MHz have been determined during the clear channel assessment routine, described above, to be effectively 'unused' and thus available for secondary use. The spectral reuse transceiver's communication control processor stores the clear channel map that is used by the symbol mapper. The clear channel hopping sequence is determined by means of a pseudo-random sequence defined by a generator polynomial and a starting PN seed value. For each pair of I/Q data retrieved from the DQPSK modulator, a symbol map look-up table is read out, to locate the appropriate carrier for the data. The value serves as an index into an array that is used to hold a multi-sample input vector for an inverse Fourier transform unit of a modulated filter bank.

Prior to being coupled to the modulated filter bank, the mapped carrier outputs of the symbol mapper are coupled to a gain multiplier, which operates on a per transmission burst basis, and serves to minimize the power level necessary to complete the radio link between the master and a remote site, and thereby avoids interfering with other links. The modulated filter bank is comprised of an inverse FFT unit and an associated polyphase filter. In accordance with the parameters of the exemplary embodiment described herein, the present invention operates within the 217-220 MHz frequency band, with adjacent carrier spacings of 6.25 KHz, yielding a total of 480 available carriers. However, among this substantial number of available frequencies only a relatively small fraction of the carriers (e.g., on the order of a dozen to several tens of channels) may actually be used.

In order to accommodate the 480 carriers within the 217-220 MHz band of interest, the inverse FFT unit is preferably configured as a 512 point inverse FFT. The polyphase filter is designed from a low-pass filter prototype, formed as a bank of bandpass filters, which are frequency-shifted versions of the low-pass filter prototype. In accordance with the invention, the low-pass filter prototype function is implemented as a six symbol wide interpolated or over-sampled, root-raised cosine filter, that is multiplied by a Tukey window (with $\alpha=5$) to further reduce sidelobes. As will be described, the low-pass impulse response of such a windowed filter mechanism settles rapidly to a relatively flat characteristic on either side of the main lobe, making it particularly suitable for use with an inverse FFT. Such a windowed filter not only has superior sidelobe performance, but retains near zero inter-symbol interference (ISI).

A respective filter section of the interpolating polyphase filter in accordance with the present invention comprises a six stage delay line, respective $z^{-1}$ stage outputs of which are coupled to coefficient multipliers, whose outputs are summed to realize an interpolated carrier value. In the exemplary parameters of the invention, the interpolation factor is times 1.5, so that for a M=512 point inverse FFT, a commutating switch coupled to the respective filter stages steps through or is commutated among the 512 points of the FFT 768 times (i.e., for each symbol it steps through the 512 inverse FFT output samples 1.5 times), producing 768 samples.

Thus, with the 512 complex values produced by the IFFT placed into six individual element delay line ($z^{-1}$) stages, the contents of a given delay line form a vector of six complex elements, and there are 768 polyphase filter components computed from the prototype filter. When the commutator selects a given inverse FFT sample, the contents of a respective delay line are multiplied by the component filter (i.e., as a vector dot product) and then summed together to form one output sample of the polyphase filter.

The output of the polyphase filter is interpolated and then translated up to an intermediate frequency of 70 MHz. The data stream is then filtered and applied to digital-to-analog converter (DAC). The output of DAC is translated via a frequency translator to the desired 217-220 MHz transmission frequency band for transmission.

The receive signal processing path direction through the spectral reuse transceiver is essentially complementary to the transmit path, described above. In particular, a received signal in the 217-220 MHz transmission band is coupled to frequency translator, which down-converts the received signal to IF. The output of the frequency translator is coupled to an analog-to-digital converter (ADC), which produces a baseband digitized output that is applied to a digital mixer. The digital mixer down-converts the received signal further, in accordance with the output of a synthesizer and applies the down-converted output to a decimator unit, whose output is the same frequency as output by the polyphase filter of the transmit section of the transceiver.

The baseband data stream is buffered in a timing correction buffer and read out under the control of a symbol timing estimator and applied to a polyphase filter, the output of which is coupled to an FFT unit. The output of the FFT unit is coupled to a frequency offset estimator, whose output is coupled to coarse and fine frequency estimation synthesizers. Coarse frequency estimation serves to reduce frequency offset to within a prescribed fraction (e.g., one-half) of adjacent carrier spacing; fine frequency estimation is performed on a burst-by-burst basis on the pure carrier portion of the preamble only. Fine frequency estimation is performed by looking at the change in phase of the carrier from symbol to symbol. The change in phase over four symbols is used as the fine frequency offset estimate.

The output of the FFT unit is also coupled to a symbol de-mapper. The symbol de-mapper employs the same mapping table as the symbol mapper in the transmit path section, described above, so that the frequency data may be recovered. The FFT is also coupled to a received signal strength indicator, which feeds the symbol timing estimator. The symbol timing estimator is also coupled to the output of a mixer which multiplies the received signal by the output of a preamble synthesizer which downconverts the preamble channel to baseband. The symbol timing estimator processes this baseband data.

The first part of the preamble of the received signal contains only pure unmodulated carrier, so as to provide an indication that the preamble is beginning. Detecting energy in that frequency bin of the FFT of the receiver means that the receiver needs to be monitoring a burst, and the output of the received signal strength indicator (RSSI) is used to enable the symbol timing estimator to find the boundaries of a received symbol. Once the symbol boundaries have been determined, the symbol timing estimator causes an appropriate shift of the data in a data buffer, to apply the received data one symbol at a time into a polyphase filter. The de-mapped frequency representative I and Q data values from the symbol de-mapper are coupled to a DQPSK demodulator. The output of the DQPSK demodulator is coupled to a Viterbi decoder, which recovers the original data and couples the data to the packet buffer.

The spectral reuse transceiver of present invention also transmits a plurality of 'tickler' tones (e.g., three to five a priori known carriers) within the (217-220 MHz) band of interest simultaneously over a short duration (e.g., four symbols, wherein a symbol is a group of 768 complex samples output by the transmitter) These tickler tones are used to initiate prescribed actions in the receiving spectral reuse transceiver. Each set of tickler tones is different from each other set and defines the action to be taken by the other transceiver.

Since the channels which constitute the tickler carriers are known, the frequency information for those (three) channels is extracted from the FFT. The absolute values of the I and Q sub-channels are summed and then normalized using an AGC value as derived from an AGC loop. The normalized value is subjected to a moving average over a prescribed symbol width (e.g., four symbols). The resulting average is then compared with a threshold. If the threshold is exceeded an output is triggered indicating the detection of the tickler tones.

As noted above, during the preamble phase of a transmitted burst, only the preamble carrier contains transmitted power from a spectral reuse transceiver. During this time, a clear channel assessment (CCA) operation is conducted, wherein each transceiver monitors the 217-220 MHz band for the presence of energy (such as that sourced from primary users). During the preamble, after RSSI and frequency offset computations, most of the remaining preamble is used for symbol timing recovery. During this time the primary goal of each transceiver's control processor is to monitor the 480-6.25 KHz channels in the 217-220 MHz band for the presence of interferers (primary users and others).

Clear channel assessment is performed at both the master site and at each of the remote sites in order to generate a current list of non-interfering (clear) channels that is compiled by the master site and distributed thereby to all remote sites in the network. By transmitting on only a clear channel, a transceiver is ensured that it will not interfere with any primary user of the spectrum of interest.

As noted previously, each remote site transceiver conducts communications with the master node and the master node conducts communications with any of the remote nodes. For this purpose the master site may employ an omnidirectional antenna, while the remote sites may use directional antennas aimed at the master site. Since, for the most part, remote sites cannot effectively listen to each other's transmissions, a virtual carrier sensing routine is carried out to convey a pending access to the channel. This mechanism is employed to negotiate multiple access of the channel. Virtual carrier sensing is defined by a prescribed pattern of clear channels that are active for a prescribed number of symbol periods (e.g., five).

The remote sites look for this pattern of clear channels and do not attempt to access the channel. A different patterned carrier sense transmission is used to indicate that the channel is clear for access requests. Each remote site transceiver with a pending message awaiting transmission will respond through a random slotted back-off, before attempting a channel access request. Once a remote site has been granted access to the channel, the master site listens for a potential transmission from the remote site during an acquisition of signal (AOS) timeout period. If a prescribed time-out occurs before a request access from a remote site transceiver is received, it is inferred that there are no remote transceivers awaiting transmission of a message. The master will only send a master access if it has a pending message to send. On the other hand, if a remote site transceiver has a message awaiting transmission, the time-out will not expire before a request transmission is received from a remote site transceiver. The master site transceiver then grants access to the remote site, followed by receipt of the remote site's message. Once the remote site's message has been received, the master site transceiver proceeds to transmit ticklers and beacon preambles at prescribed intervals or messages as they become available.

From a remote site transceiver's standpoint, the remote site transceiver is initially listening for a media open tickler or a master access tickler. When a media open tickler is received, the remote site transceiver delays transmitting, or 'backs off' a random number of time slots, and then transmits a request access tickler (unless, during the back-off period, the remote receives an access grant tickler from the master, which indicates that some other remote has gained control of the media). When the remote site transceiver receives an access grant tickler from the master site, it transmits a message before returning to its monitoring state. Where a master access tickler is received, the remote site transceiver listens for a message from the master. If the message from the master is not received within a timeout period, then the remote will return to listening for ticklers.

BRIEF DESCRIPTION OF THE DRAWINGS

FIG. 27 is a state diagram of the general operation of the spectral reuse transceiver of the present invention;

FIG. 28 shows the contents of a 'beacon preamble' burst, that is periodically transmitted by a master site transceiver;

FIG. 29 shows the contents of an 'initialization' single-carrier burst which is transmitted by a master site transceiver;

FIG. 30 shows the contents of a standard message burst used by a master site transceiver for the transmission of information to a remote site transceiver;

FIG. 31 shows a 'tickler' burst;

DETAILED DESCRIPTION

Figure 1:
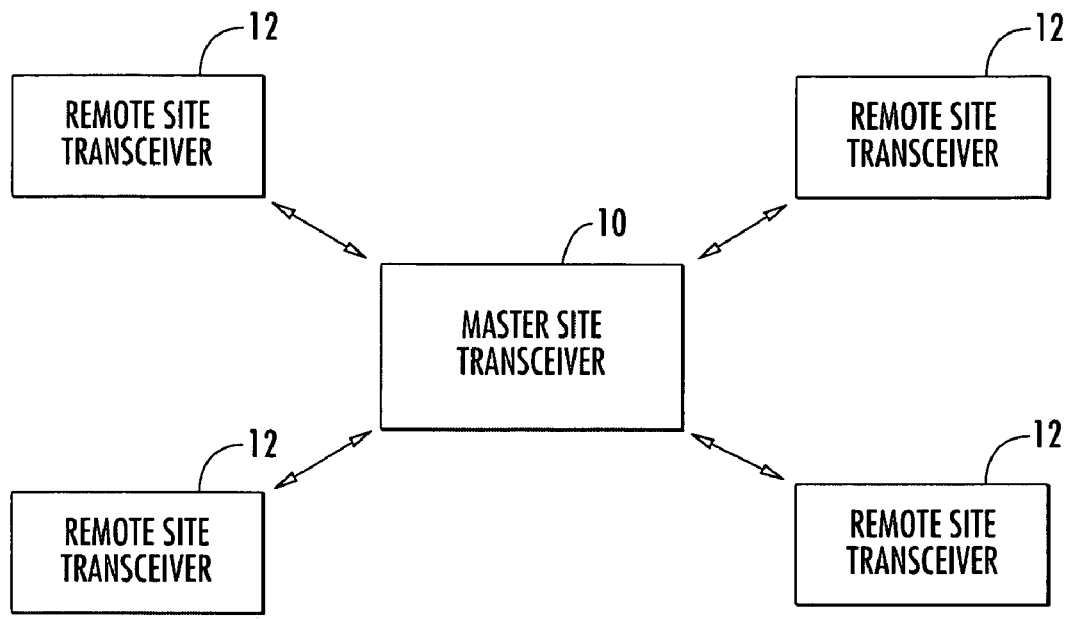
FIG. 1 diagrammatically illustrates the overall architecture of a communication network, respective terminal unit transceiver sites of which employ the spectral reuse transceiver of the invention.

Before detailing the spectral reuse transceiver for an OFDM-based communication system and associated link utilization control mechanism of the present invention, it should be observed that the invention resides primarily in a prescribed arrangement of conventional communication circuits and components, and supervisory digital control and signal processing circuitry that controls the operations of such circuits and components. Consequently, in the drawings, the configuration of such circuits and components, and the manner in which they are interfaced with various communication circuits have, for the most part, been illustrated by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the various components of the invention in convenient functional groupings, so that the present invention may be more readily understood.

Attention is initially directed to FIG. 1, which diagrammatically illustrates a master site—multiple remote site configured communication network, respective terminal unit transceiver sites of which employ the spectral reuse transceiver of the invention, to be detailed below. As shown therein the network contains a master terminal transceiver site or hub 10 and a plurality of remote terminal transceiver sites 12. As pointed out above, the master site's spectral reuse transceiver 10 may employ an omnidirectional antenna, so that the master site's terminal unit may communicate with any of the remote site transceivers, while each remote site spectral reuse transceiver 12 may employ a directional antenna whose boresight axis is pointed toward the master site. The remote sites are intended to communicate exclusively with the master site.

As will be detailed below, the master site periodically initiates a clear channel assessment routine, which is conducted at both the master site 10 and at each of the remote nodes 12. This routine is used to gather a list of non-interfering or 'clear' communication channels that may be employed by participants of the network. By transmitting on only what has been identified as a clear channel, a respective site's transceiver is ensured that it will not interfere with any primary user of the 217-220 MHz band of interest.

When a remote site transceiver is not transmitting, it is listening for ticklers from the master SRT. This does not require a sequential stepping through the clear channel list. The position of the tickler carriers is known a priori and are derived from the clear channel list. The only time that the remote sequentially steps through the channels is either during clear channel assessment of during the join (network discovery) process.

During the preamble period of any message transmitted by the master, each remote site's transceiver scans all 480-6.25 KHz frequency bins within the 217-220 MHz spectrum for the presence of energy. Any bin containing energy above a prescribed threshold is masked as a non-clear channel, while the remaining channels of the 480 possible are marked as clear channels.

The master site transceiver 10 sequentially interrogates each remote site transceiver for its clear channel list via a clear channel request message. In response to receiving a clear channel request message, a respective remote site transceiver 12 transmits back to the master the clear channel list it obtained during the preamble portion of the master site transceiver's message. The master site 10 continues to sequentially interrogate each of the remote transceivers, via subsequent clear channel list requests, until it has completed interrogation of every remote site transceiver.

The master unit then logically combines all of the clear channel lists from all the interrogated remote transceivers to produce an 'aggregate' clear channel list. This aggregate clear channel list is stored in the master site's transceiver and is broadcast to all of the remote site transceivers. When the aggregate clear channel list is received at a respective remote site it is stored in its transceiver.

As noted earlier, both the master site transceiver 10 and the remote site transceivers 12 execute a synchronization function to ensure that the endpoint radios are synchronized to a common set of the clear channel list, channel hopping sequence, and preamble channel. A remote site transceiver 12 determines a lack of network synchronization by an absence of received network messages from the master. Primarily, a remote site transceiver will use the periodic aggregate clear channel list that it expects to receive from the master site as a network "heartbeat." A remote transceiver also employs a counter which indicates the amount of time elapsed from the last network message received. Then based upon the activity level of these two indicators, a remote site transceiver will determine whether it is properly synchronized with the network. If the remote site transceiver determines that it is not properly synchronized, it will fall into the normal initialization sequence for an uninitialized node. In the special case that a remote transceiver detects a primary user on the preamble channel, the remote site transceiver will send a message to indicate the conflict such that the master site transceiver 10 can indicate to the remaining remote transceivers 12 to fall back to the next preamble channel candidate based on a predetermined algorithm. The remote site transceiver will then switch to the next preamble candidate as well. In the case where the master site transceiver detects a primary user on the preamble channel, it will initiate a switch to the next preamble channel candidate by sending a message indicator to all remote site transceivers. Those remote site transceivers not in conflict with the primary user will receive the message and switch. Those remote site transceivers that are in conflict will likely be unable to receive the message and will ultimately time out and declare a loss of network synchronization. At this point they will initiate a normal initialization sequence.

Figure 2:
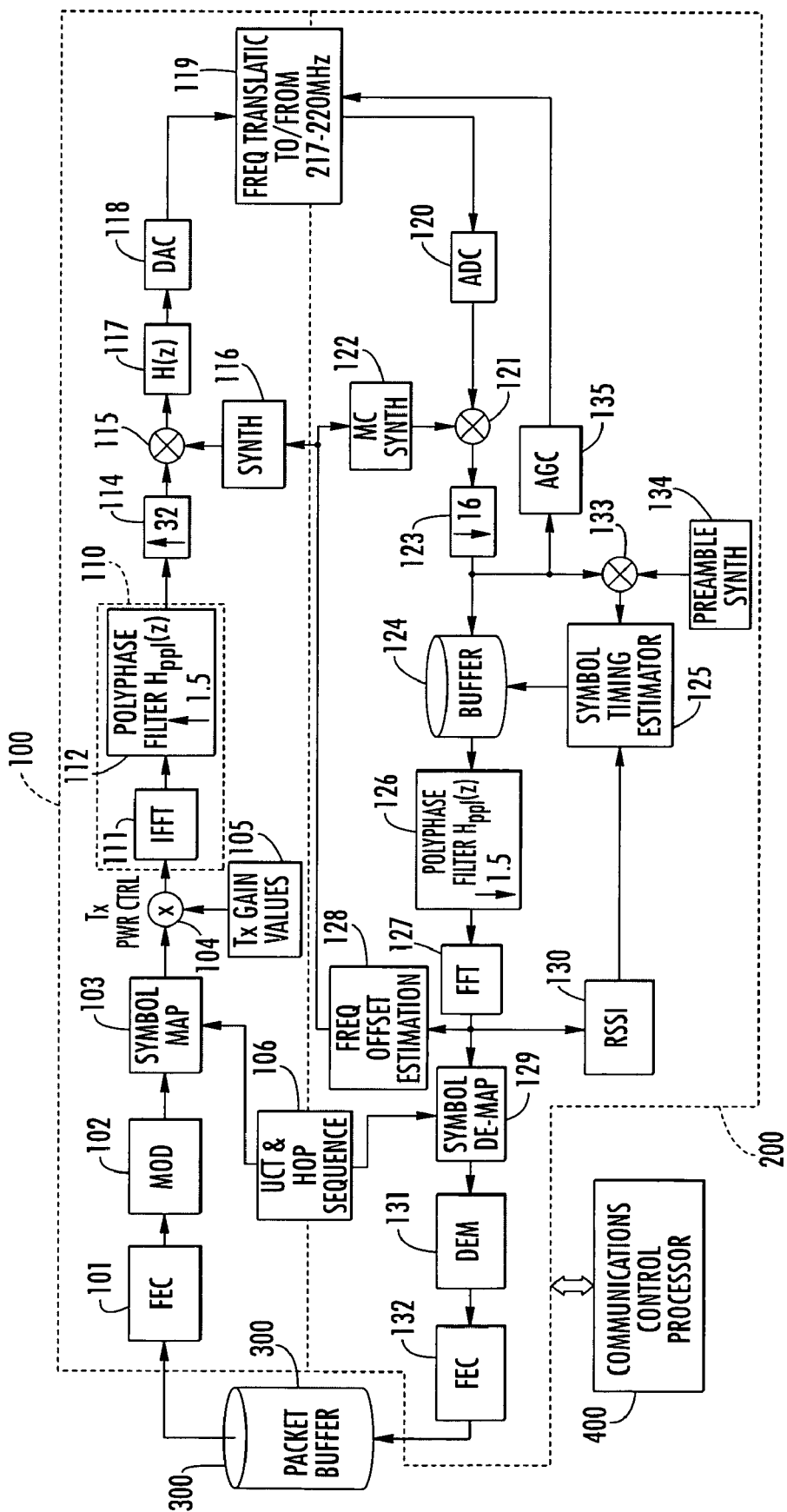
FIG. 2 diagrammatically illustrates the architecture of a spectral reuse transceiver in accordance with the present invention.

Attention is now directed to FIG. 2, wherein the overall architecture of a spectral reuse transceiver in accordance with the present invention is diagrammatically illustrated as comprising a transmitter section 100 and a receiver section 200. The input to the transmitter section 100 is a digital information packet supplied from an associated packet buffer 300 into which packets are coupled from an associated serial communication link and intended for transmission to a remote transceiver site. Conversely, the output of the receiver section 200 is a digitized data packet that has been transmitted from the remote transceiver site, the packet being coupled to the packet buffer 300. A communications controller 400 supervises the operation of the transceiver.

In the digital signal processing path through transmitter section 100, a respective packet from the packet buffer 300 is initially subjected to forward error correction (FEC) encoding by an FEC unit 101. As a non-limiting example FEC unit 101 may comprise a Viterbi encoder, which performs conventional convolutional encoding of an input packet. The output of FEC unit 101 is then coupled to a modulator 102. In accordance with a non-limiting, but preferred embodiment of the present invention, modulator 102 is implemented as a differential quaternary phase shift keyed (DQPSK) modulator.

Advantages of using DQPSK include the fact that carrier phase lock is not required; non-coherent demodulation can be used. Also, in an OFDM system, phase uncertainty can be caused by either carrier phase offset or sample timing offset. A sample timing offset produces a phase offset on the carriers that is linearly increasing with the carrier number. DQPSK relieves some of the sample timing synchronization requirements. In addition, synchronization in most OFDM systems utilize pilot carriers during acquisition and tracking. It is preferable not to use such techniques in the spectral reuse transceiver of the present invention, which frequency hops only a limited number of data bearing carriers. This makes synchronization more complex. DQPSK removes these problems. A disadvantage of using DQPSK is that the non-coherent demodulation results in approximately 3 dB BER performance degradation. However, the transceiver is not power limited.

Figure 3:
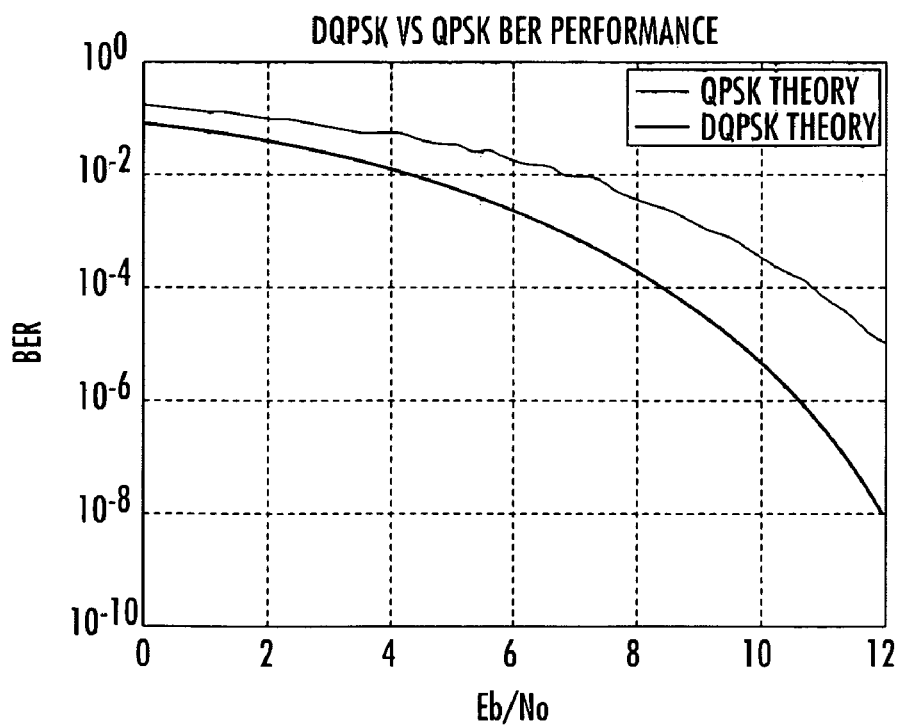
FIG. 3 is a dual graphical plot of the theoretical bit error rate (BER) curve for DQPSK compared with the variation for coherent QPSK.

FIG. 3 is a dual graphical plot of the theoretical bit error rate (BER) curve 21 for DQPSK compared with the variation 22 for coherent QPSK. As shown therein, QPSK offers better performance. However, since the invention is not power limited, it is able to use increased gain with DQPSK to overcome the 3 dB reduction in performance in comparison with QPSK.

Figure 4:
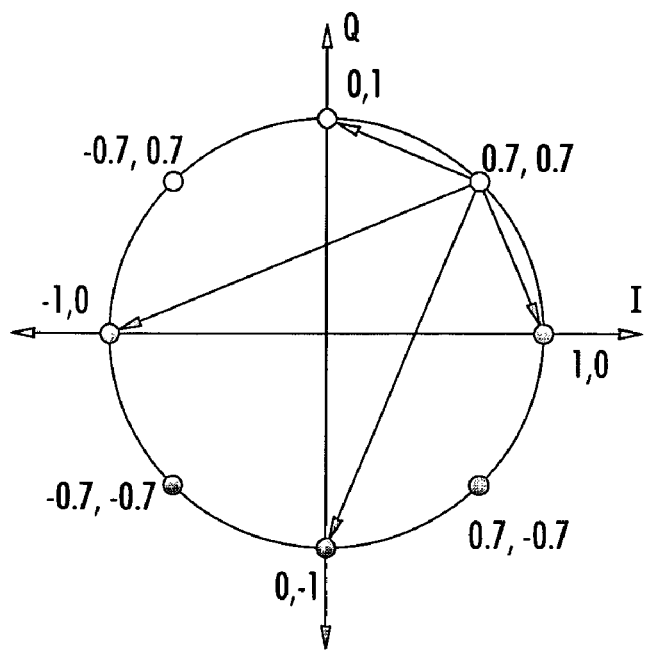
FIG. 4 shows a constellation for n/4 DQPSK.

Pursuant to a preferred implementation, DQPSK modulator 102 utilizes $\pi/4$ DQPSK. This means that each input to modulator 102 will result in a phase shift in the constellation of $\pi/4$, $3\pi/4$, $5\pi/4$, or $7\pi/4$ degrees. The constellation is shown in FIG. 4. As shown therein, a transition from the point (0.7, 0.7), for example, may take any one of four paths, none of which passes through zero. The following equations are used to perform differential encoding.

$$I_{n+1} = I_n * i\text{Data}_{n+1} - Q_n * q\text{Data}_{n+1}$$

$$Q_{n+1} = Q_n * i\text{Data}_{n+1} + I_n * q\text{Data}_{n+1}$$

These equations produce a transition from the current constellation point to the next point given the input bit pair ($i\text{Data}_{n+1}$, $q\text{Data}_{n+1}$).

The I and Q outputs of the DQPSK modulator 102 are coupled to a symbol mapper 103, which maps the I and Q data from the modulator into the appropriate carrier(s) in accordance with a carrier hopping sequence 106. Mapping data onto the carriers requires knowledge of a 'clear channel' map and the hopping sequence. As pointed out briefly above, and as will be explained in detail below, a clear channel map is a compilation of all current 'available' frequencies within the band of interest—here which ones of 480-6.25 KHz spaced channels that make up the band from 217 MHz to 220 MHz are determined to be 'unused' and are thus available for use by the spectral reuse transceiver. The communication control processor supplies a two dimensional multibyte array as a clear channel map to the mapper 103. Each bit in the mapping array indicates whether a respective channel is clear and thereby available for use, or is to be avoided, as will be described. The hopping sequence is determined by means of a pseudo-random sequence defined by a generator polynomial and a starting seed value.

The control processor computes the sequence of available carriers that will be used to transmit FEC encoded data given the above information. This computation is performed off-line (i.e., not in real time as the message burst is transmitted). The maximal length packet is approximately 700 bytes. If, for example, 8 of 480 carriers are utilized to transmit the packet, and assuming that the FEC code rate is ½, then 1 byte can be transmitted in one symbol. This results in a 700 symbol transmission, not including the preamble. The table may be shorter as the period of the PN sequence dictates. This assumes that each entry in the table is a carrier frequency index (stored as a multibit (e.g., 16 bit) value). During transmission of a packet, this look-up table (LUT) is used to select which carriers will be used. The same operation is performed in the demodulator path of the transceiver, to derive which carriers have been received as will be described. For each pair of I/Q data retrieved from the DQPSK modulator 102, the symbol map look-up table is read to locate the appropriate carrier for this data. The value serves as an index into an array that is used to hold a 512 sample input vector for a downstream inverse Fourier transform (IFFT or $FFT^{-1}$) unit 111 of modulated filter bank 110.

The mapped carrier outputs of the symbol mapper 103 are coupled to a gain multiplier 104, which operates on a per transmission burst basis, and serves to minimize the power level to complete the radio link with a remote site, so as to avoid interfering with other links. For this purpose, the gain multiplier 104 is further coupled to receive a set of gain values stored in a gain value table 105, which is loaded by the control processor. Over time, statistics may be gathered on bit error rate (BER) to allow dynamic adjustment of the power to a remote site. Also, power is controlled within the burst, so that the preamble can be transmitted at maximum power (e.g., 2 W in one 6.25 KHz carrier). The data-bearing portion of the burst may be nominally transmitted at 0.25 W per subcarrier.

The output of the gain multiplier 104 is coupled to a modulated filter bank 110, which is comprised of IFFT unit 111 and an associated polyphase filter 112. (It can be shown mathematically that a polyphase filter placed at the output of an inverse fast Fourier transform functions as a modulated filter bank.) As pointed out above, in the exemplary embodiment described herein, the present invention operates within the 217-220 MHz frequency band, with adjacent carrier spacings of 6.25 KHz, yielding a total of 480 available carriers. However, among this substantial number of available frequencies only a relatively small fraction of the carriers (e.g., on the order of a dozen to several tens of channels) may actually be used.

Figure 5:
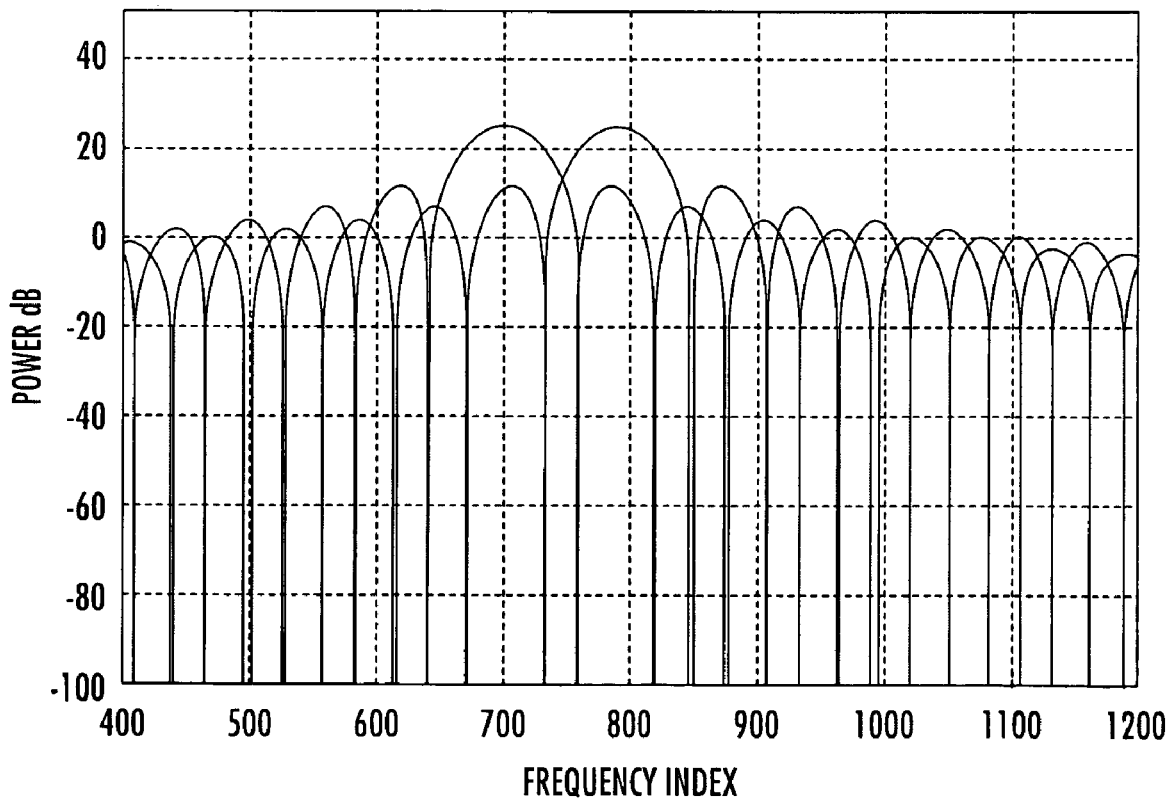
FIG. 5 depicts the multicarrier frequency spectrum produced by an inverse fast Fourier transform absent a polyphase filter.

In order to accommodate the 480 carriers within the 217-220 MHz band of interest, IFFT unit 111 is preferably configured as a 512 point IFFT. FIG. 5 depicts the multicarrier frequency spectrum produced by an IFFT absent the polyphase filter. As shown therein, for an adjacent pair of center frequencies 41 and 42, the sidelobes amplitudes are not constrained and occupy a substantial portion of the adjacent bandwidth, mandating the need for some form of spectral shaping (sidelobe containment). This is particularly true in the case of traditional OFDM, where the IFFT employs rectangular windowing in the time domain, resulting in a sin(x)/x shaped frequency spectrum. The sidelobe performance of this function is relatively poor, with the first sidelobe being only 13 dB down from the main lobe. It may be noted that applications of OFDM are not concerned with the poor sidelobe performance of the IFFT output. This is because the traditional OFDM modems are designed to use the entire frequency band of interest (in the present example, 217-220 MHz). The sidelobes must be attenuated outside of the band of interest, and this is done via a simple bandpass filter after the IFFT. In the present invention, there is no access to the entire band and each spectral reuse transceiver must avoid licensed users operating in the band of interest. Therefore, spectral shaping becomes critical.

Figure 6:
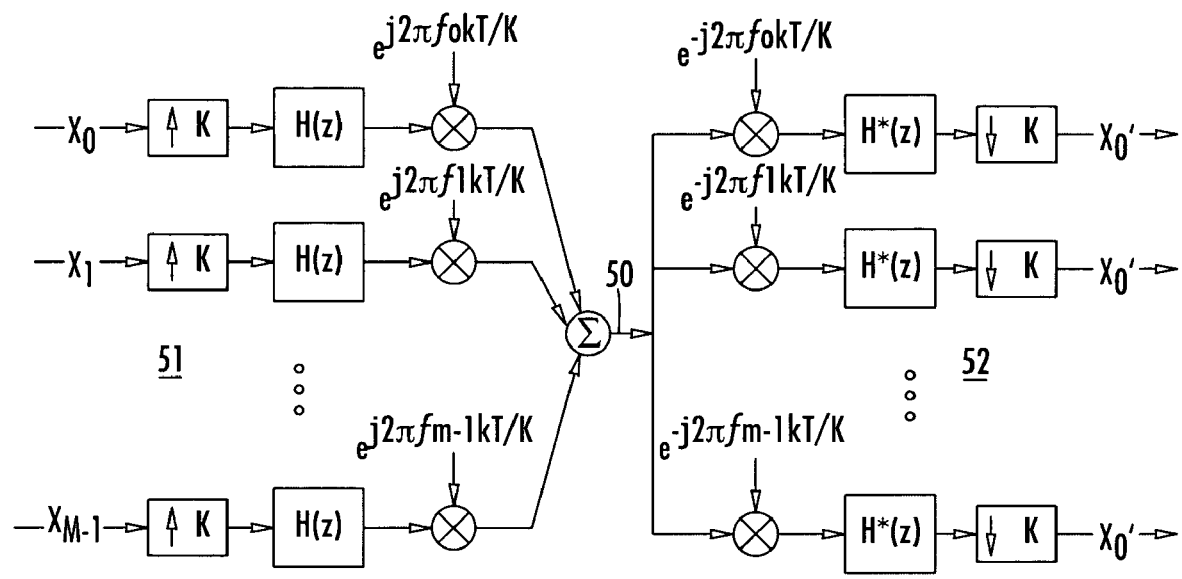
FIG. 6 diagrammatically illustrates a mathematical model of a communication system employing a modulated filter bank structure, which can be readily implemented with a discrete Fourier transform (DFT)-based signal processing operator (e.g., an IFFT) followed by a polyphase filter.

Although there are several ways to shape the spectrum of an OFDM modulator output, in accordance with the transceiver of the present invention, polyphase filtering is employed. It can be shown that a polyphase filter placed at the output of an IFFT behaves as a modulated filter bank. This means that while the polyphase filter is designed from a lowpass filter prototype, the polyphase filter becomes a bank of bandpass filters, which are frequency-shifted versions of the lowpass prototype. FIG. 6 diagrammatically illustrates a mathematical model of a communication system employing such a modulated filter bank structure. As shown therein, an inverse discrete Fourier transform (DFT)-based transmitter 51 containing a lowpass filter operator H(z) is coupled to the transmit end of a communication channel 50, a receive end of which contains a DFT-based receiver 52 having a complementary lowpass filter operator $H^{-1}(z)$.

Figure 7:
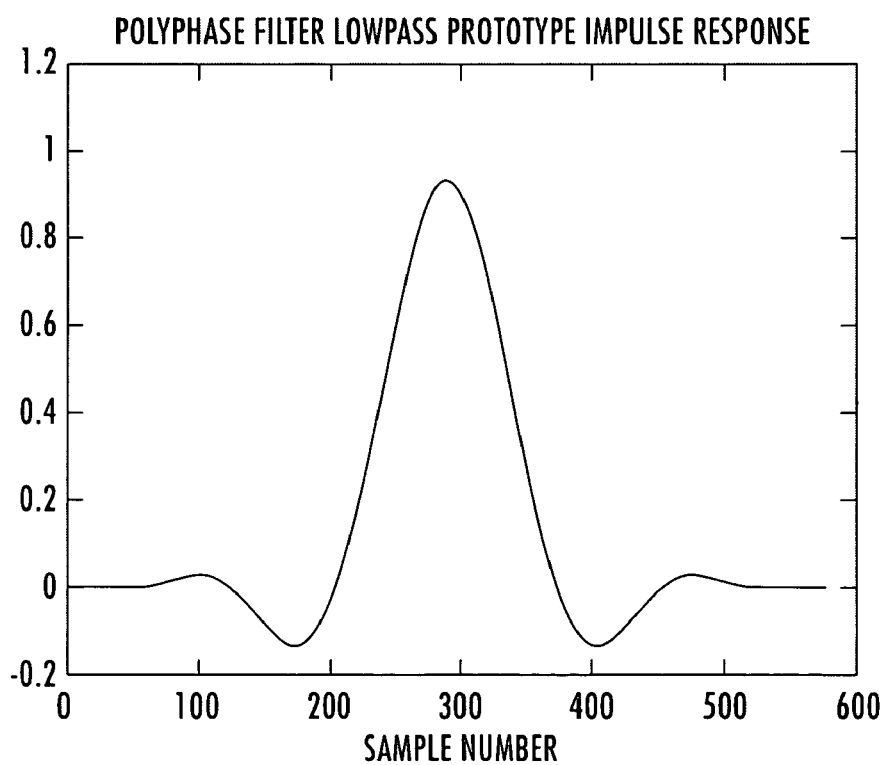
FIG. 7 shows the windowed lowpass prototype filter impulse response (the basis of the polyphase filter)

In accordance with the invention, the lowpass prototype function H(z) in the mathematical model of FIG. 6 is implemented as a six symbol wide interpolated or oversampled root-raised cosine filter, that is multiplied by a Tukey window (with $\alpha=5$) to further reduce sidelobes. As shown in FIG. 7, the lowpass impulse response of such a windowed filter mechanism settles rapidly to a relatively flat characteristic on either side of the main lobe, making it particularly suitable for use with an IFFT where only a subset of carriers are utilized and spectral leakage into adjacent carriers must be kept to a minimum. Such a windowed filter not only has superior sidelobe performance, but retains near zero inter-symbol interference (ISI).

Figure 8:
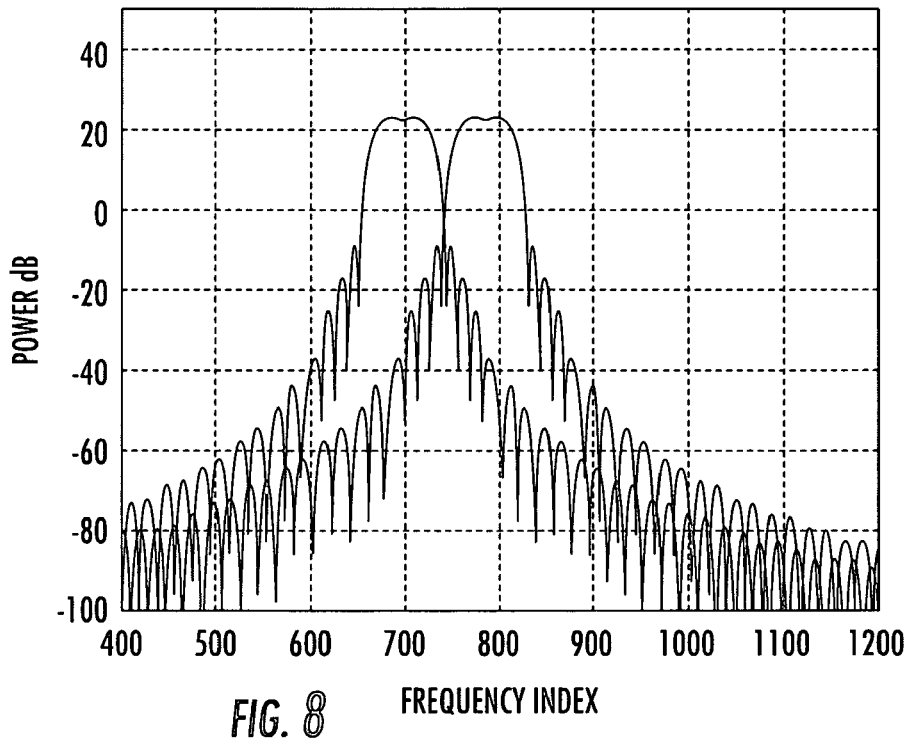
FIG. 8 shows the composite spectral response of a modulated filter bank for a pair of adjacent carrier frequencies.

The composite spectral response of such a modulated filter bank 110 for a pair of adjacent carrier frequencies is shown in FIG. 8. As can be seen therein, as the carrier separation is increased to only two or three carrier increments, the sidelobe suppression is very substantial (on the order of 85-100 dB down). While the use of a modulated filter bank implemented by a cascaded arrangement of an inverse FFT and a polyphase for OFDM-based communications has been described in the literature (see for example, an article entitled: "Filtered Multitone Modulation for Very High-Speed Digital Subscriber Lines" by Giovanni Cherubini, et al., *IEEE Journal On Selected Areas In Communications*, Vol. 20, No. 5, June 2002), tailoring of the filter response characteristic as through the use of oversampling and application of a Tukey window, as well as the selective transmission of only a selected and varying subset of the available carriers, as carried out in accordance with the present invention, has not been described or suggested. (The Cherubini paper discusses the motivation for Filtered Multitone Modulation as mitigating interference due to echo and near-end crosstalk.)

Namely, although the present invention employs the combination of an IFFT and a polyphase filter as an efficient way to partition the data onto a variable number of frequency hopped carriers, which is somewhat similar to OFDM, the spectral reuse transceiver of the invention does not utilize all of the possible carriers (512 for a 512 point IFFT). In fact, in the 217-220 MHz frequency band of the present example, there are only 480 available carriers. As pointed out above, of these, only a limited number subset are used.

Figure 9:
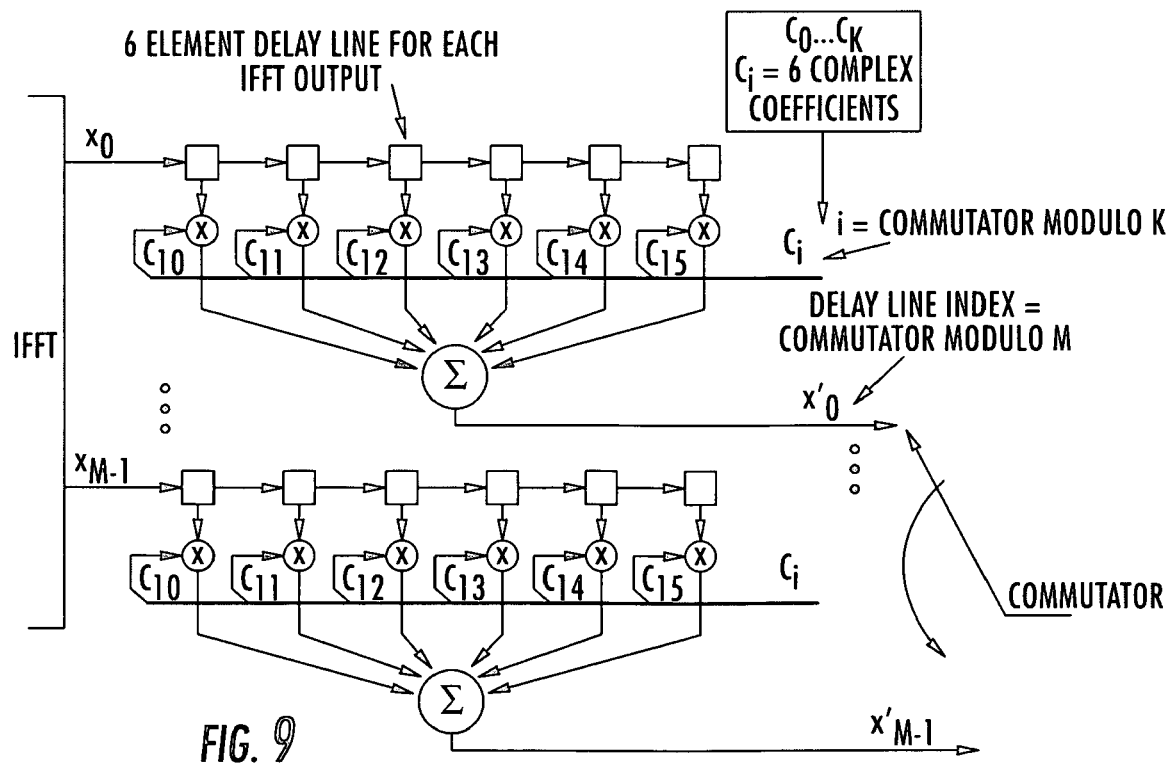
FIG. 9 diagrammatically illustrates the architecture of an interpolating or over-sampled polyphase filter in accordance with the present invention.

FIG. 9 diagrammatically illustrates the architecture of an interpolating or oversampled polyphase filter in accordance with the present invention. As shown therein, each filter section comprises a six stage delay line, respective $z^{-1}$ stage outputs of which are coupled to coefficient multipliers, whose outputs are summed to realize an interpolated carrier value. In the present example, there is oversampling by 50%, namely, the interpolation factor is times 1.5, so that for a M=512 point IFFT of the present example, the commutator 81 is rotated counterclockwise 768 times (i.e., for each symbol it steps through the 512 IFFT output samples 1.5 times), producing 768 samples. Thus, the sampling rate is increased by a factor of 1.5.

With the 512 complex values produced by the IFFT placed into six individual element delay line ($z^{-1}$) stages, the contents of a given delay line form a vector of six complex elements, and there are 768 polyphase filter components computed from the prototype filter (shown in the FIG. 9 as $C_i$). Thus, each polyphase filter component contains six complex values. Each time the IFFT is executed, the commutator will cycle through all 768 component filters. When the commutator selects a given IFFT sample, the contents of a respective delay line are multiplied by the component filter (i.e., as a vector dot product) and then summed together to form one output sample of the polyphase filter.

The output of the polyphase filter is coupled to a times thirty-two interpolator 114. The use of this interpolator is based upon the parameters of the signal processing in the IFFT and the carrier spectrum of interest. In the present example, with a carrier spacing of 6.25 KHz, and an interpolation factor of 1.5, the effective IFFT rate is 6.25 KHz/1.5, or on the order of 4.1 KHz. The effective sample rate corresponds to the FFT rate, times the FFT size, times the interpolation factor, namely, the rate at which the complex data stream leaves the polyphase filter 112 is:

Sample rate=(6.25 KHz/1.5)*512*1.5=3.2 MHz.

This data stream must be upsampled so that the data can be translated up in frequency digitally to an intermediate frequency of 70 MHz. To this end, the 3.2 MHz data stream is digitally upsampled by a factor of 32, to realize an interpolated sample rate of 102.4 M samples/sec, at the output of interpolator 114. The output of interpolator 114 is then up-converted by digital mixer 115, which performs frequency translation to the intermediate frequency of 70 MHz. The output of mixer 115 is then filtered by bandpass filter 117 and applied to digital-to-analog converter (DAC) 118. The output of DAC 118 is then translated via a frequency translator 119 to the desired 217-220 MHz transmission frequency band for transmission.

The receive signal path direction through the transceiver is generally complementary to the transmit path described above. In particular, a received signal in the 217-220 MHz transmission band is coupled to frequency translator 119, which down-converts the received signal to IF. The output of frequency translator 119 is coupled to analog-to-digital converter (ADC) 120, which produces a baseband digitized output that is applied to digital mixer 121. Digital mixer 121 down-converts the received signal further in accordance with the output of synthesizer 122 and applies the down-converted output to a decimator unit 123, the output of which is the same frequency as output by the polyphase filter 112, namely 3.2 MHz, as described above.

The received baseband data stream is then buffered in a timing correction buffer 124 and read out under the control of a symbol timing estimator 125 (to be described below with reference to FIG. 12) and applied to a polyphase filter 126, the output of which is coupled to an FFT unit 127. The output of the FFT unit 127 is coupled to three signal processing operators in the receive path. A first is a frequency offset estimator 128, the output of which is coupled to synthesizers 116 and 122, and which is operative to perform coarse and fine frequency estimation, as will be described. Coarse frequency estimation serves to reduce frequency offset to within a prescribed fraction (e.g., one-half) of adjacent carrier spacing; fine frequency estimation is performed on a burst-by-burst basis on the pure carrier portion of the preamble only. Fine frequency estimation is performed by looking at the change in phase of the carrier from symbol to symbol. The change in phase over four symbols is used as the fine frequency offset estimate.

A second signal processing operator, to which the output of the FFT unit 127 is coupled, is a symbol de-mapper 129. Symbol de-mapper uses the same mapping table 106 as the symbol mapper 103, so that the frequency data may be recovered. A third signal processing operator is a received signal strength indicator (RSSI) unit 130, which feeds the symbol timing estimator 125. The symbol timing estimator 125 is also coupled to the output of a mixer 133, which multiplies the received signal by the output of a preamble synthesizer 134, and is used to extract energy in the preamble that will enable the symbol timing estimator to perform its function.

Since the first part of the preamble of the received signal is pure carrier, which provides an indication that the preamble is beginning, detecting energy in that frequency bin means that the receiver needs to be monitoring a burst, and the output of the RSSI unit 130 is used to enable the symbol timing estimator 125 to find the boundaries of a received symbol. In the parameters of the present example, 768 samples per symbol are being supplied to the receiver, but the symbol boundaries are unknown. The manner in which symbol timing is estimated by symbol timing estimator 125 (FIG. 12) is described below. Once the symbol boundaries are known, the symbol timing estimator causes an appropriate shift of the data in buffer 124 as necessary to apply the received data one symbol at a time into polyphase filter 126.

The de-mapped frequency representative I and Q data values from the symbol de-mapper 129 are coupled to a demodulator 131 which, in the present example, is a DQPSK demodulator. DQPSK demodulation is a non-coherent scheme where the phase difference is derived from symbols $(I_k, Q_k)$ and $(I_{k-1}, Q_{k-1})$ for a given carrier, and requires storage of the previous (I,Q) data for each data bearing carrier. The algorithm to perform differential QPSK demodulation is given by the following equations:

$$I\text{Data}_{n+1} = \text{sign}(Q_{n+1}*Q_n + I_{n+1}*I_n)$$

$$Q\text{Data}_{n+1} = \text{sign}(Q_{n+1}*I_n + I_{n+1}*Q_n)$$

The output of DQPSK demodulator 131 is coupled to a Viterbi decoder 132, which recovers the original data and couples the data to the packet buffer.

As described briefly above, the symbol timing estimator 125 is operative to cause an appropriate shift of the data in the elastic buffer 124 as necessary to apply the received data one symbol at a time into polyphase filter 126. As noted previously, a symbol corresponds to 512 complex samples that result from one execution of the IFFT 111 in the transmitter path. If perfect symbol timing is achieved in the receive path, then the same 512 samples will be input to the FFT unit 127.

A symbol timing error means that the 512 samples input to the FFT are some number of samples offset from the true transmitted symbol.

Estimation of symbol timing is critical, since most of the processing downstream of the FFT 127 requires that data input to the FFT 127 be symbol-aligned. If the symbol is not aligned, several performance degradations will occur. First, ISI will occur because the symbol presented to the FFT has samples from two different symbols. Also, a symbol timing offset will create a linearly increasing phase offset with respect to frequency in the post FFT data. Another issue for symbol timing recovery is adjacent channel interference (ACI). The symbol timing recovery algorithm must perform acceptably in the presence of ACI.

Figure 10:
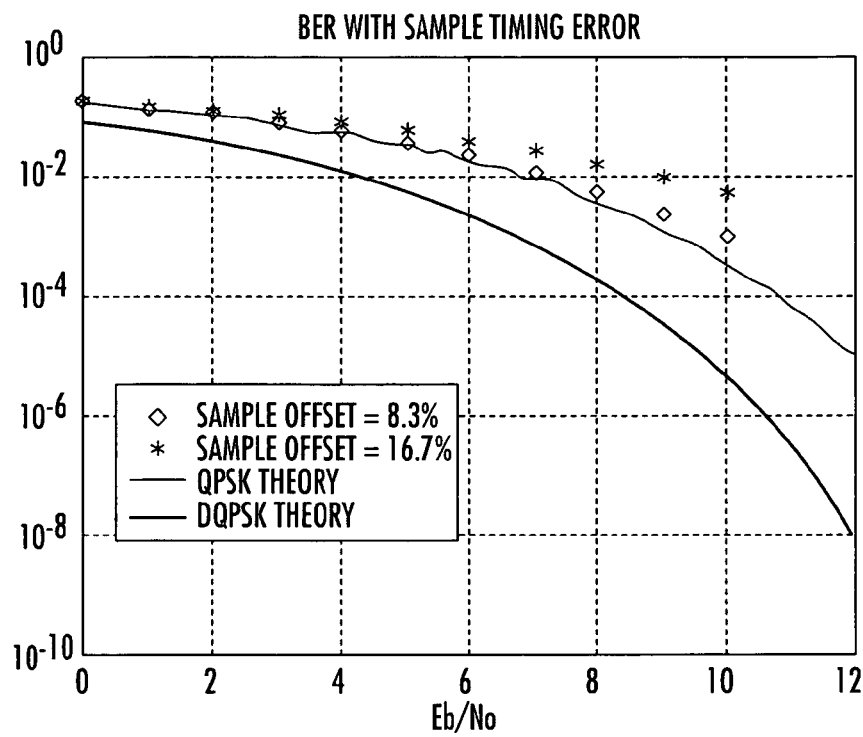
FIG. 10 plots bit error rate vs. Eb/No for a demodulator employed in the spectral reuse transceiver of the invention where there is a sample timing error.

The BER curve plotted in FIG. 10 indicates how sensitive the demodulator is to symbol timing errors. As seen in the plot, a symbol-timing offset of 16.7% of symbol duration will result in a performance degradation of approximately 2 dB. It is desired that symbol-timing provide an estimate that will fall well within 16% of a symbol.

Figure 11:
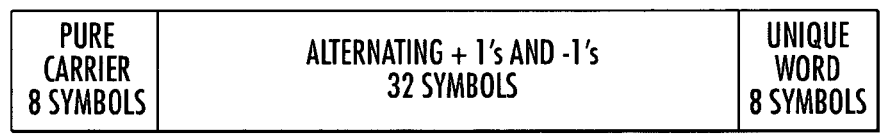
FIG. 11 shows the composition of a burst preamble employed for the spectral reuse transceiver of the invention.

To aide in the recovery of symbol timing, the preamble of a respective transmission burst contains a plurality of N symbols of alternating +1s and −1s (where N is approximately 32), as shown in FIG. 11. To convert the preamble channel down to baseband, the symbol timing estimator employs the signal processing flow shown in FIG. 12. This allows lowpass filtering to attenuate ACI. The resulting signal is the alternating +1/−1 symbols degraded by noise, phase/frequency offset, and whatever ACI transits through the lowpass filter.

Figure 12:
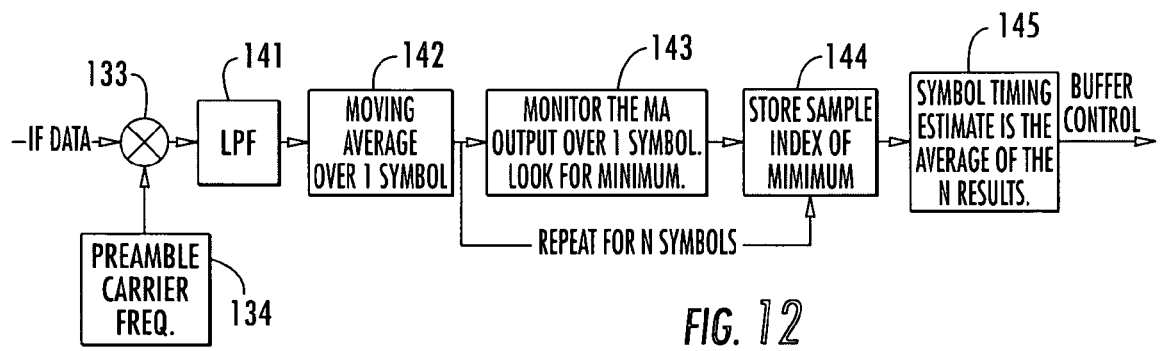
FIG. 12 shows the signal processing flow path through a symbol timing estimator for a spectral reuse transceiver of the invention.
Figure 13:
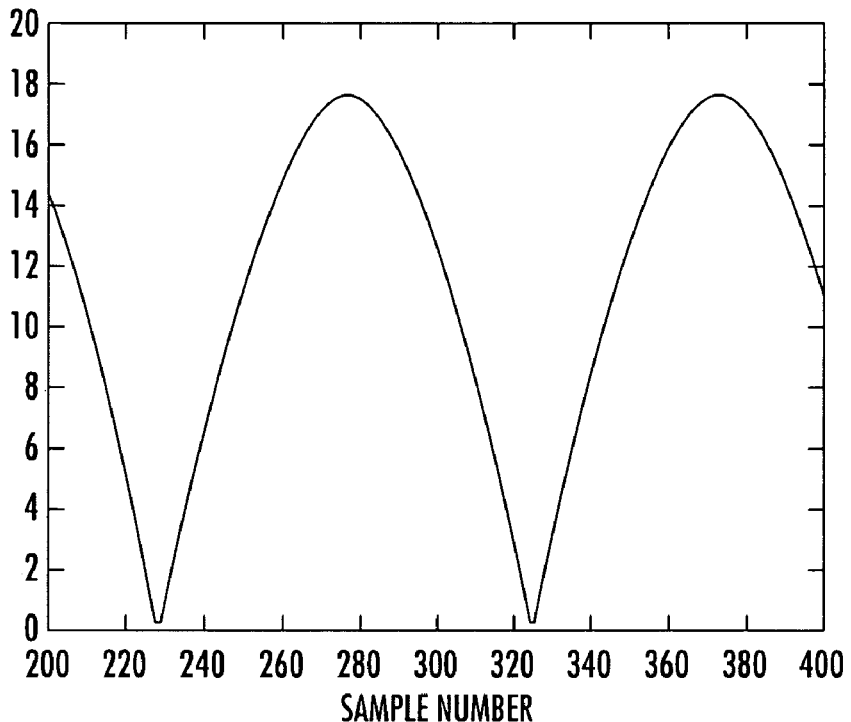
FIG. 13 shows the output of the moving average correlator of the symbol timing estimator of FIG. 12.

As shown in FIG. 12, the output of mixer 133 is coupled through a low pass filter 141, which serves to reject an interference that might be caused by nearby primary user that is close to the preamble channel, to a moving average (MA) correlator 142. The MA is a window that is one symbol long (namely, 768 samples of I and Q data). The output of the MA correlator 142 is shown in FIG. 13. Each minimum in FIG. 12 represents a time when the MA window is centered on a symbol transition point. (Note that in FIG. 13, the minima occur every 96 samples. To make simulation times reasonable, a 64-carrier system was simulated.) The output of the moving average correlator 142 is monitored at 143 over one symbol to find the minimum. The sample index of the minimum is stored at 144 and the average of N operations is provided as a symbol timing estimate at 145. As pointed out above, this result is used to adjust or shift the data in the buffer 124 as necessary to provide symbol alignment.

Figure 14:
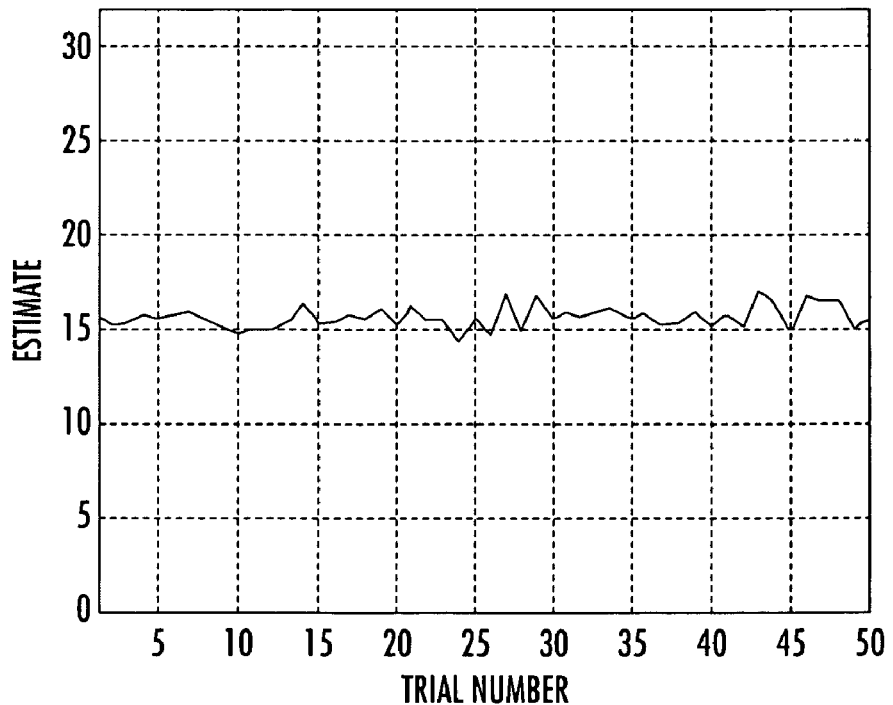
FIG. 14 plots symbol timing estimate in the absence of adjacent channel interference.

Because, in the presence of noise, the sample index for the minima will vary, multiple symbols are averaged together to obtain the final estimate. Simulation results show that the symbol timing estimator performs well in noise. It should be noted that the transmit power of the preamble is 10 dB higher than the data bearing portion of the burst. During the preamble, only one carrier is being used to transmit data. Therefore, a full 2 W of output power can be transmitted on the preamble carrier. FIG. 14 plots symbol timing estimate in the absence of adjacent channel interference and indicates an Eb/No of 15 dB during the preamble. This means that the Eb/No is 5 dB during the data bearing portion of the burst. In practice, the FCC limits the amount of power per channel to 2 W resulting in an Eb/No of 14 dB during the preamble.

Figure 15:
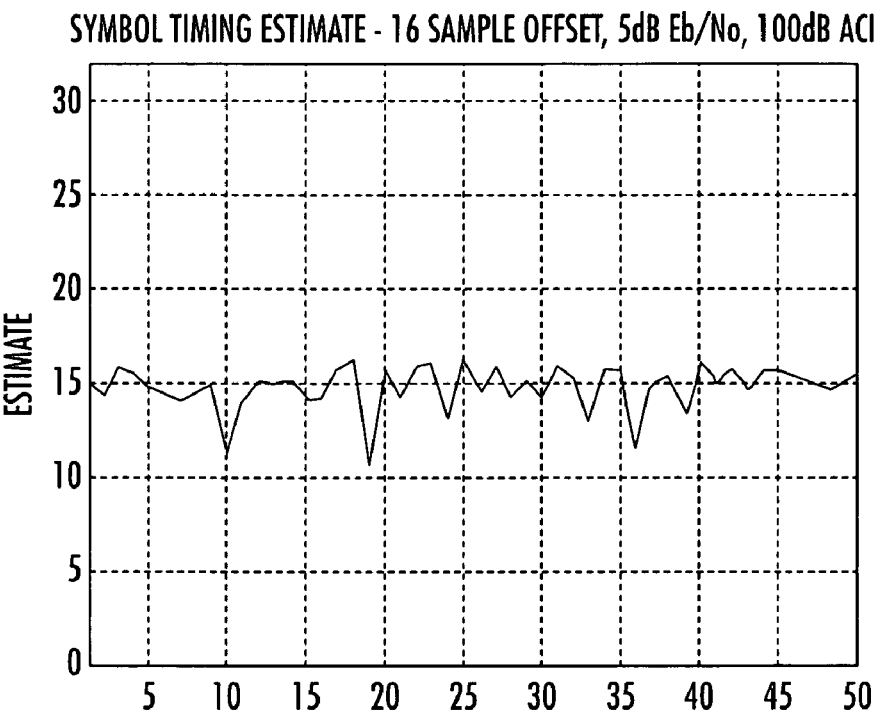
FIG. 15 plots symbol timing estimate in the presence of adjacent channel interference.
Figure 16:
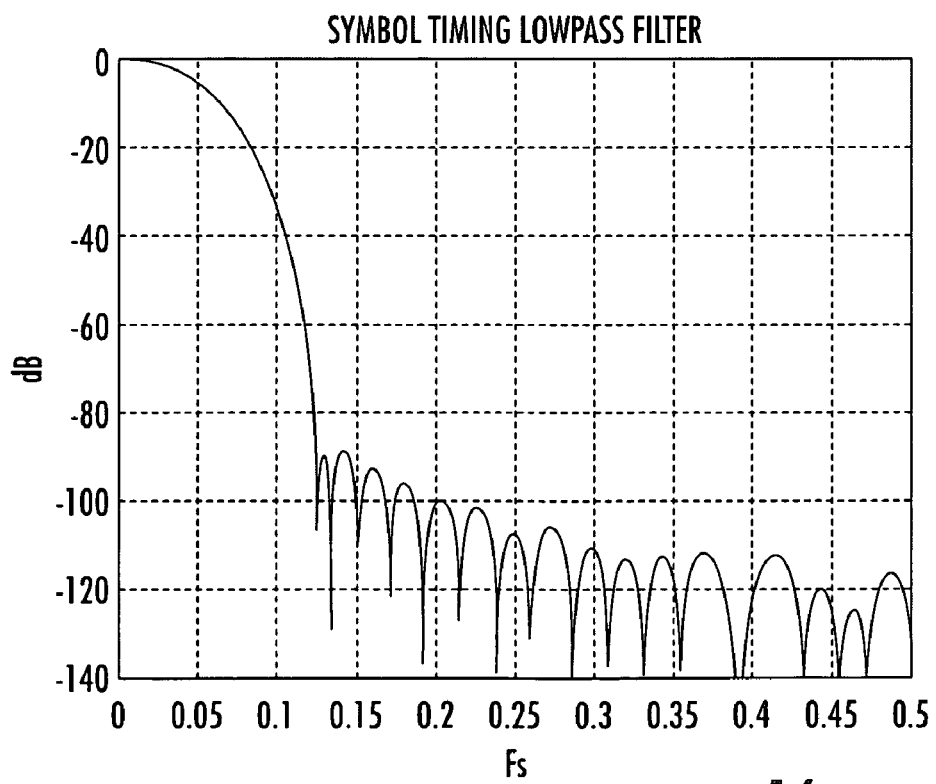
FIG. 16 shows the spectral transfer function of a forty tap implementation of the lowpass filter used for adjacent channel interference rejection in the symbol timing estimator of FIG. 12.

FIG. 15 plots the performance of the symbol timing in the presence of adjacent channel interference. From a comparison of the data plotted in FIG. 15 with that of FIG. 14 it can be seen that the symbol timing estimator performs very well in the presence of noise and implies that the low pass filter 141 of FIG. 12 is critical to performance. The transfer function of a forty tap lowpass filter of FIG. 12 is shown in FIG. 16. It should again be noted that the simulation results are for a 64-carrier system so that simulation times are reasonable. It will be readily appreciated that the filter characteristic of FIG. 16 is more complex for a 512-carrier system, as the sampling rate is greater. Even though more coefficients are required, implementation of the symbol timing filter is readily achieved with a decimated sampling rate. This is acceptable since symbol timing estimate accuracy need only be within one-sixth of a symbol.

It may be noted that during a transmission burst, symbol timing will drift, which gives rise to the issue as to whether it is necessary to track symbol timing during the data-bearing portion of a burst. Analysis has revealed that given the maximal length of a burst and given the accuracy of the oscillators, there is no need to track. Once the symbol-timing estimate is computed and applied at the beginning of the burst, symbol timing does not need to be tracked for the remainder of the burst.

As pointed out above, the receive signal strength indicator (RSSI) unit 130, which is used to detect the pure carrier portion of the preamble, triggers the demodulator to begin processing an incoming burst (i.e. begin frequency offset estimation). The objective is to reliably detect the pure carrier portion of the burst preamble in as few symbols as possible. The detection process is directly linked to the RF front end AGC unit 135, since primary users will cause the AGC unit 135 to attenuate the desired SRT receive signal.

Figure 17:
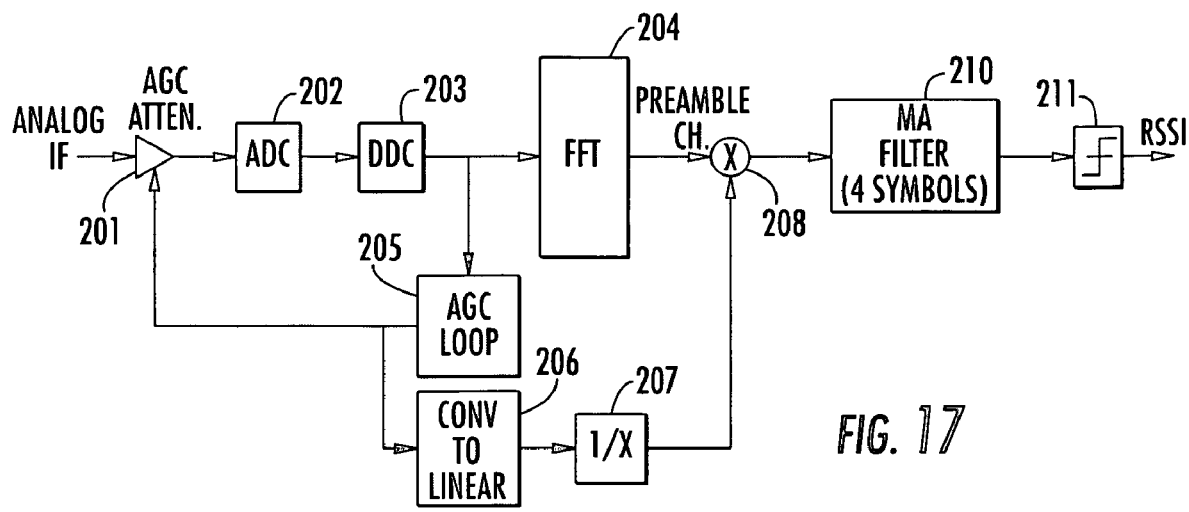
FIG. 17 is a block diagram of a received signal strength indicator algorithm.

A block diagram of the RSSI unit 130 showing connectivity to the AGC circuit 135 is shown in FIG. 17. As pointed out above, this unit serves to detect the pure carrier portion of the preamble. Known a priori is the carrier frequency (i.e., the identity of the frequency bin of the FFT corresponding to that carrier frequency). The input to the RSSI unit is derived from the IF front end, which is coupled to an AGC attenuator 201, the output of which is digitized by an ADC 202 and coupled through a digital down-converter (DDC) 203 to an FFT unit 204. The output of the DDC is coupled to an AGC control loop 205 for adjusting the AGC attenuator 201. It is also coupled to a normalizer path that includes a linear converter 206, the output of which is coupled through a 1/X divider feeding a multiplier/mixer 207 feeding a mixer 208. The output of the FFT unit 204 is also coupled to mixer 208.

Because the front end AGC impacts all carriers being received, including energy from unwanted interferers, it is necessary to perform an averaging operation over a plurality of symbols (e.g., four, in the present example). For this purpose, the output of mixer 208 is coupled to a four-symbol moving average (MA) filter, which serves to average over four symbols whatever energy is coming out of the preamble channel bin. The output of the moving average filter is then compared to a threshold in unit 211. Whenever the threshold is exceeded, the RSSI output is triggered.

Figure 18:
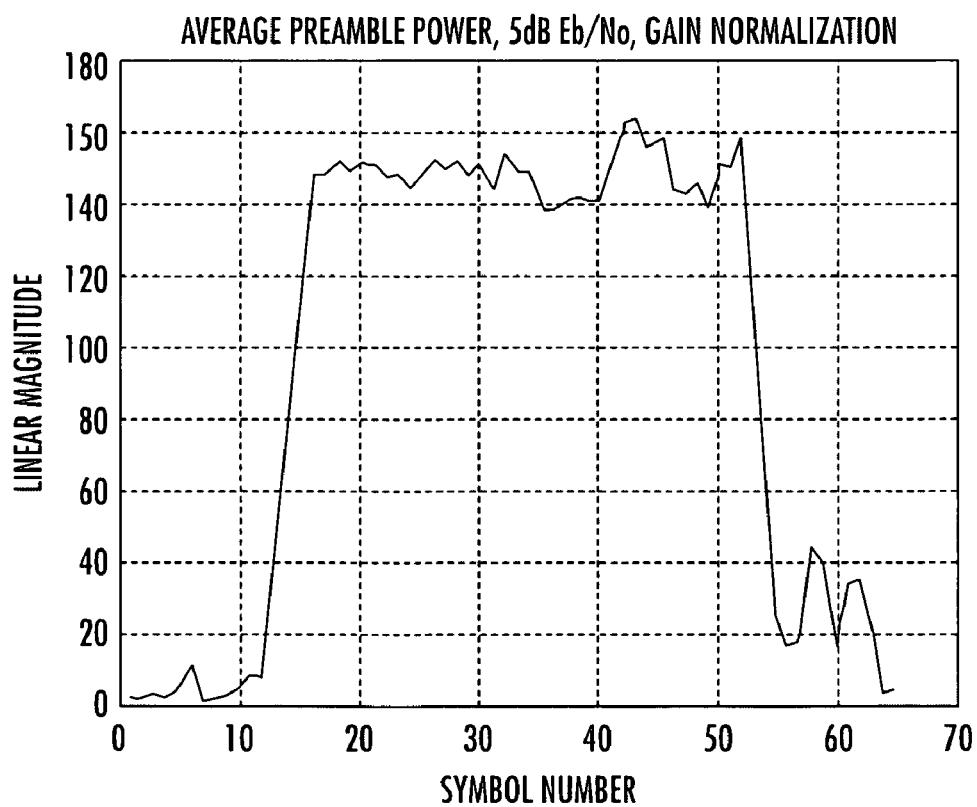
FIG. 18 graphically plots the output of the RSSI algorithm of FIG. 17.

FIG. 18 graphically plots the RSSI normalized moving average. As shown therein during the presence of preamble carrier, there is a very noticeable rise in power level, which is detected as the beginning of a burst. As noted above, and as shown in FIG. 17, the preamble carrier detector is coupled with the automatic gain control, which is monitoring the power in the entire frequency band. This power must not saturate the analog-to-digital converter 202 or else information will be lost. Therefore the AGC loop detects the input power and adjusts AGC attenuator 201, so that the ADC does not saturate. This AGC attenuation of the front end is effectively removed by the normalization circuitry described above, to which the AGC correction output is also fed.

Figure 19:
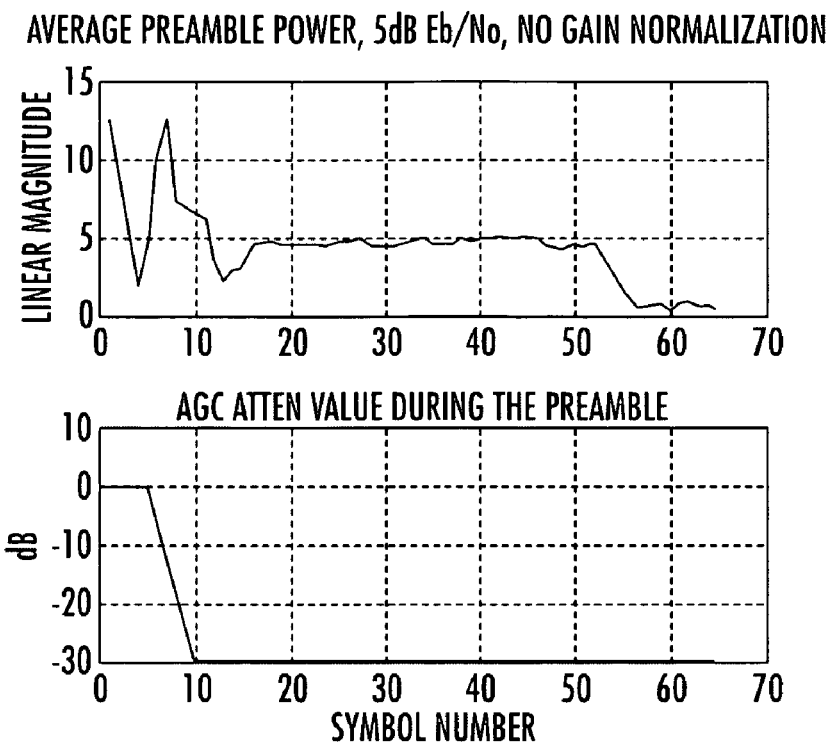
FIG. 19 graphically plots the output of the RSSI algorithm when AGC normalization is not performed.

The importance of normalization will be appreciated by reference to FIG. 19, which shows the output of the moving average filter 210 of FIG. 17, for the case that AGC normalization is not performed. From a comparison of FIGS. 18 and 19 it can be seen the AGC normalization serves to provide a very strong identification of average preamble power.

Figure 20:
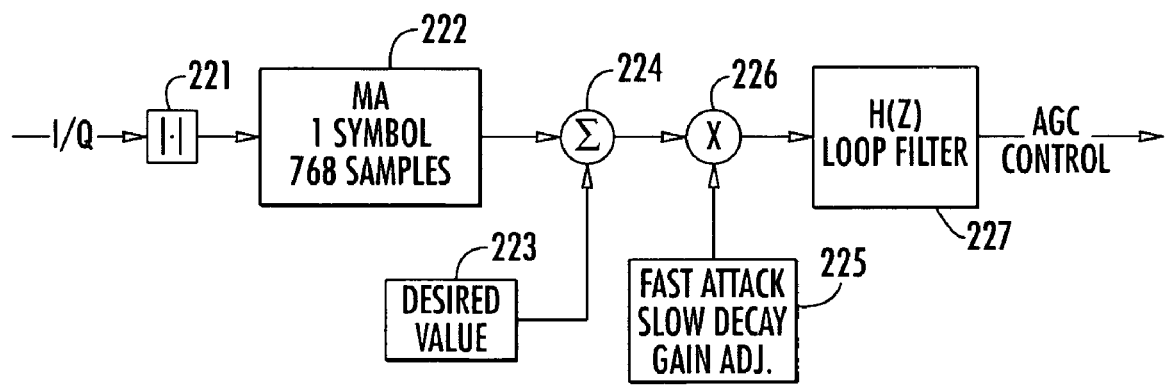
FIG. 20 diagrammatically illustrates the configuration of a front end AGC unit.

FIG. 20 diagrammatically illustrates the configuration of the front end AGC unit. The front end 211 of the AGC unit takes the absolute value of the I and Q data and feeds the absolute value data to a moving average operator 222, which derives an average of one symbol (768 samples in the present example). This provides a metric of the power level. From this average a desired value 223 is subtracted at 224 to provide an error value. This error value is then subjected to a fast attack, slow decay gain adjustment 225 at 226 and filtered at 227 to provide the desired AGC control output.

Figure 21:
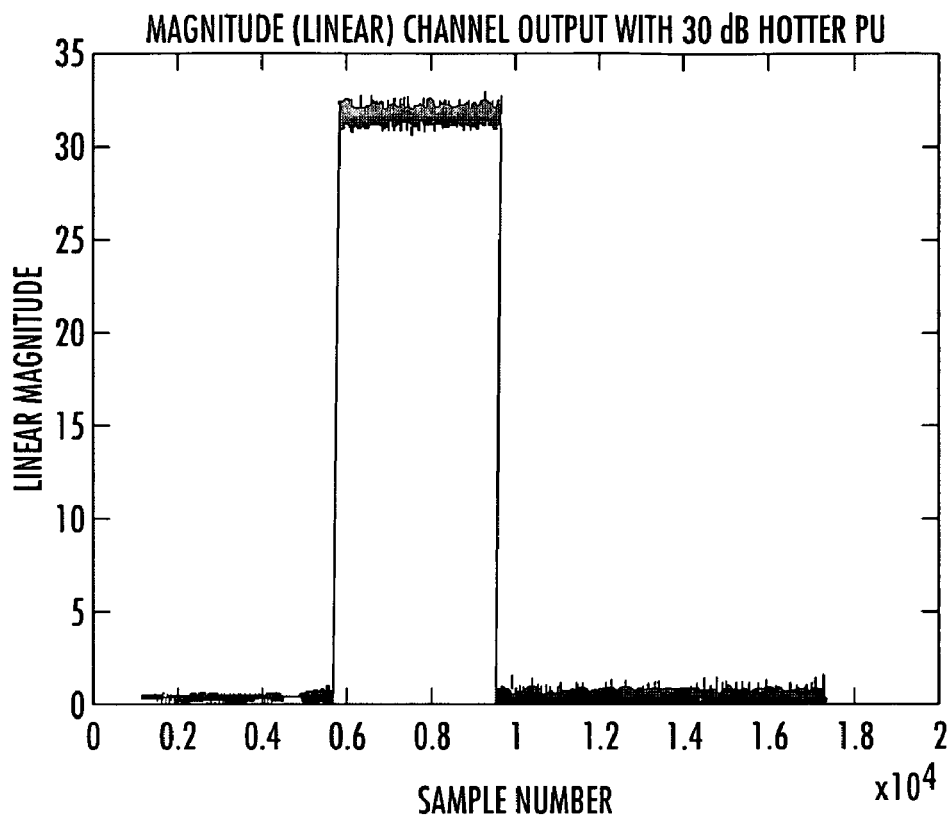
FIG. 21 depicts a time domain waveform of a received signal in the presence of adjacent channel interference.
Figure 22:
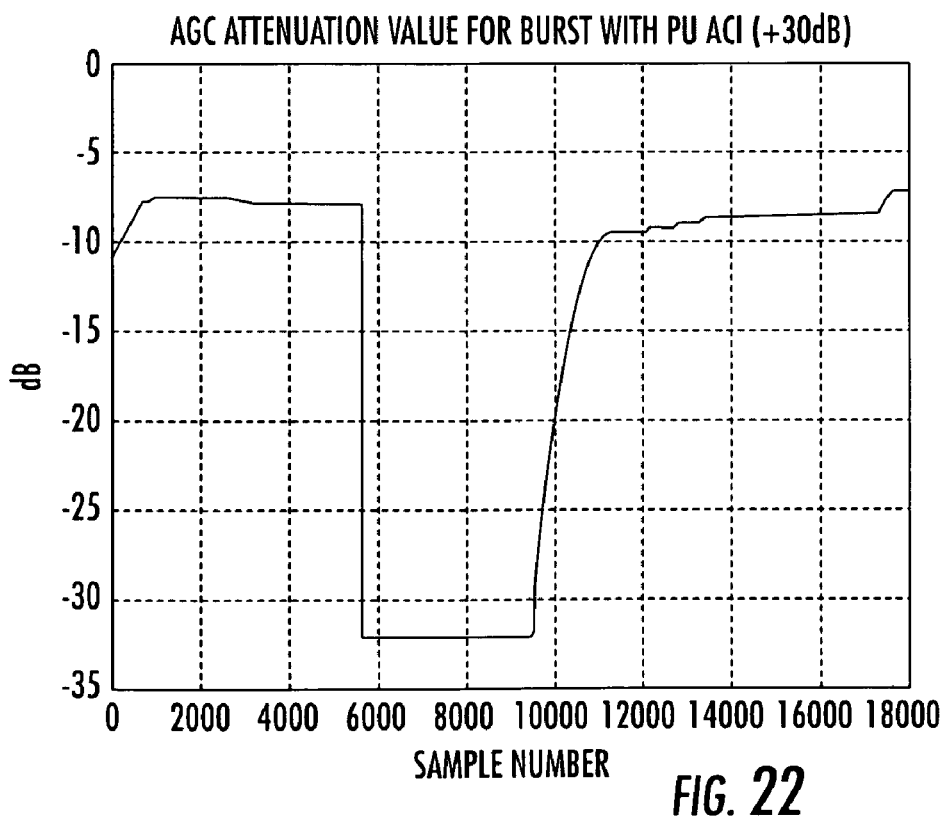
FIG. 22 shows the effect of AGC attenuation on an adjacent channel interferer.

FIG. 21 depicts the resulting time domain waveform, containing pure carrier at the beginning portion of alternating +1' and −1s, as described above. The large amplitude portion of the waveform constitutes an adjacent interferer. The issue is how well does the AGC operation attenuate the interferer. This is shown in the waveform in FIG. 22, wherein the front end attenuator is driven down hard (fast attack) at the onset of the interference frequency, so as to prevent the ADC from saturating as described above. As soon as the adjacent channel interferer is gone the power ramps back up, as shown.

Figure 23:
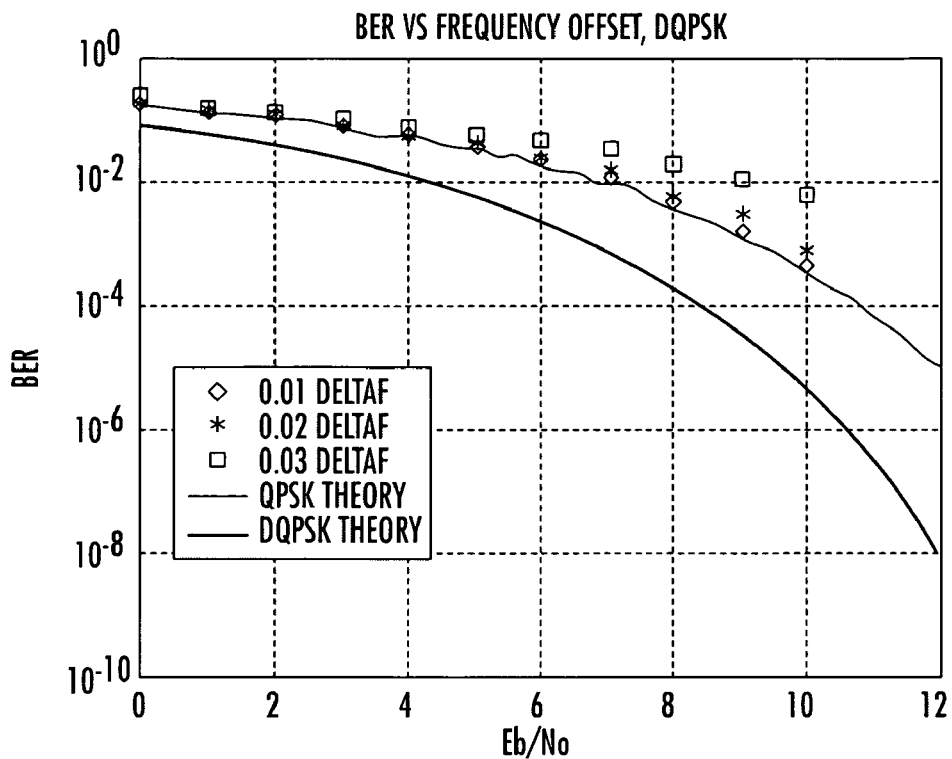
FIG. 23 is a graphical plot of bit error rate vs. Eb/No in the presence of frequency offset at the receiver.

If the down-converter fails to accurately frequency translate the baseband data consisting of 512 carriers, there will be a performance degradation. FIG. 23 shows what happens to BER performance when there is a frequency offset in the receiver. The figure shows the degradation caused by several frequency offsets defined as a percentage of the carrier spacing. To compensate for this problem, the invention conducts a coarse frequency estimation and a fine frequency estimation. The coarse frequency estimation serves to reduce frequency offset to within a prescribed fraction (e.g., one-half) of adjacent carrier spacing (which is 6.25 KHz in the present example). Then, a fine frequency estimation can be made by operating the preamble data post FFT.

The coarse frequency estimation operation involves having the FFT monitor the beginning of the preamble during a modem training exercise when the spectral reuse transceiver is first deployed. While training, the unit does not receive data packets, but instead monitors the incoming bursts and perform coarse frequency offset estimation. The location of preamble is discovered via the network join process, but there may be a frequency offset. The energy in the preamble will appear nominally in the frequency bin in which it is expected. In this case there would be no frequency offset. However, part of the energy may show up in an adjacent channel. This indicates that the down-converter local oscillator needs to move in frequency, so that all the energy shows up in the expected bin of the receiver FFT. The demodulator looks for power in a small group of channels surrounding and including the known preamble channel. The power of the FFT in the receiver is utilized to locate the preamble. Average power levels are monitored in these channels (FFT bins). The objective is to find the preamble and adjust the digital down-conversion to move the preamble into the desired FFT bin. Success is declared when most of the signal power is confined to the desired FFT bin. It should be noted that both the remote receiver digital down-conversion and the remote transmitter digital up-conversion will be adjusted based on this frequency offset. This will remove frequency offset in both the uplink and downlink.

Once coarse frequency acquisition is completed, bursts can be fully demodulated. At this point, fine frequency estimation is performed on a burst-by-burst basis on the pure carrier portion of the preamble only. Fine frequency estimation is performed by looking at the change in phase of the carrier from symbol to symbol. The change in phase over four symbols is used as the fine frequency offset estimate.

Figure 24:
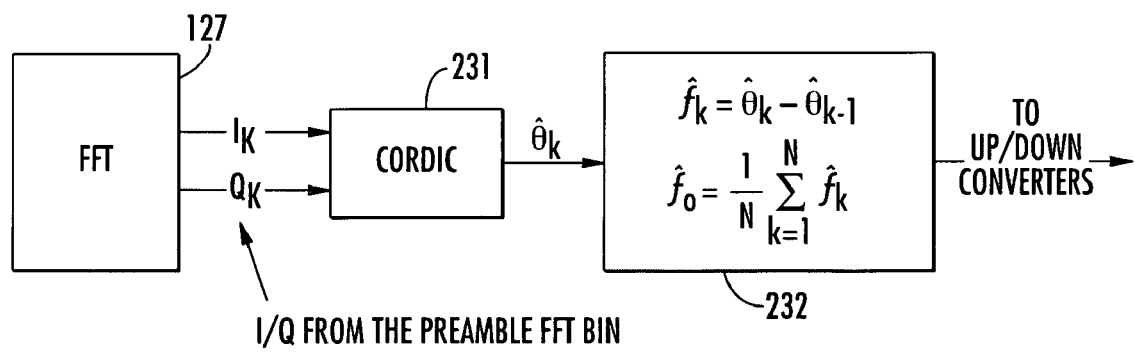
FIG. 24 diagrammatically illustrates the signal processing architecture of a fine frequency estimator.

This is be accomplished as shown in FIG. 24 using a CORDIC operator 231 to calculate the phase angle Θ of the incoming I and Q pure carrier data. The CORDIC routine needs only to be invoked at the symbol rate (i.e., at 6.25 KHz/1.5 in the present example) and the resulting phase angle averaged over four symbols. The phase difference is computed at 232.

Figure 25:
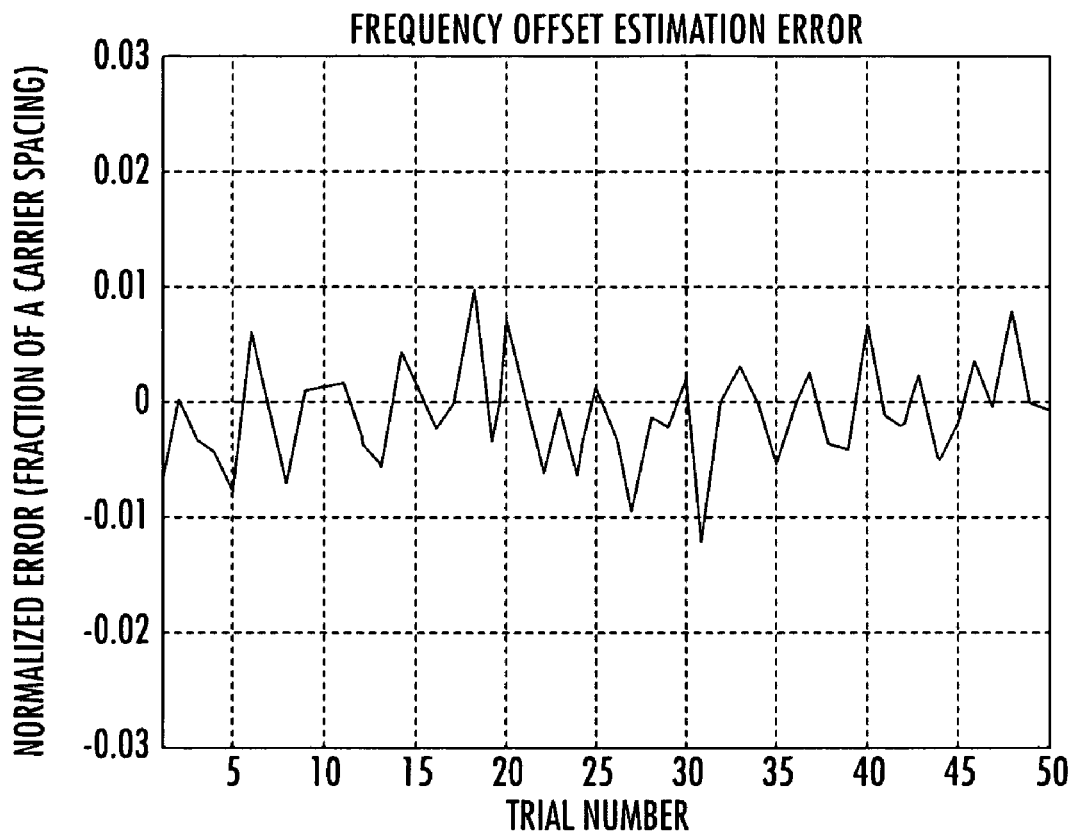
FIG. 25 shows the accuracy of the fine frequency estimator for an Eb/No of 5 dB when averaging over four pure carrier symbols.

FIG. 25 shows the accuracy of the fine frequency estimator for an Eb/No of 5 dB when averaging over four pure carrier symbols. FIG. 25 shows a variance of 0.01 (0.01×6.25 Khz), which is shown by the diamond curve in FIG. 23, referenced above. This is a one time estimate, that does not require tracking during the burst.

Figure 26:
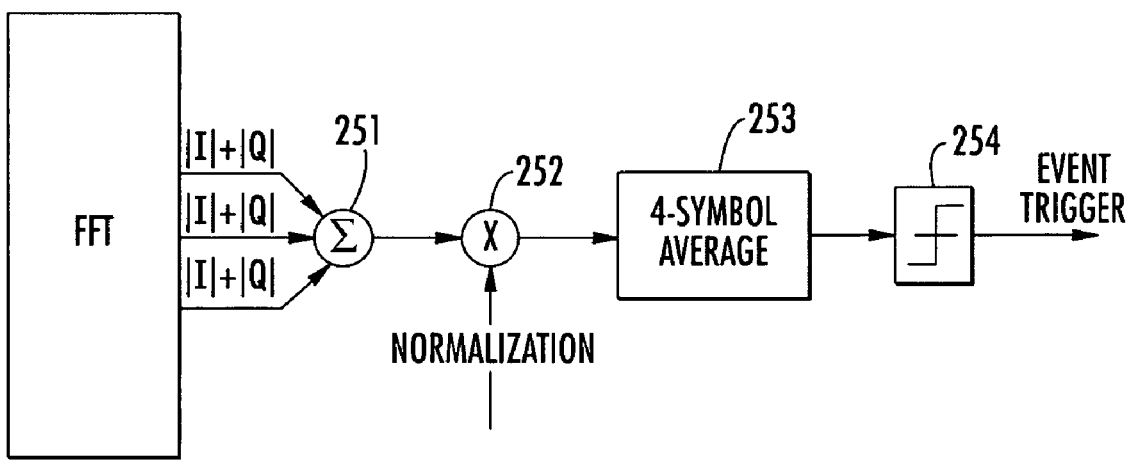
FIG. 26 shows the signal processing flow path for tickler detection.

As pointed out above, the present invention makes use of a plurality of 'tickler' tones (e.g., three to five a priori known carriers) in the (217-220 MHz) band of interest that are transmitted simultaneously over a short duration (e.g., four symbols, as shown) for the purpose of initiating an action in the receiving site's transceiver. The question is how to detect this energy. At the outset, it should be noted that which channels constitute the tickler carriers will have been defined by the master site are given to the remote sites. As shown in FIG. 26, the frequency information for those channels is extracted from the FFT. The absolute values of the I and Q subchannels are summed at 251 and then normalized at 252 using the AGC value as derived from the AGC loop described above. The normalized value is then subjected at 253 to a moving average over a prescribed symbol width (four symbols in the present example). The resulting average is then compared with a threshold at 254. If the threshold is exceeded an output is triggered indicating the detection of tickler tones.

The manner in a network comprised of a plurality of the spectral reuse transceiver's described above is configured, and communications are conducted between the master site and respective remote sites will now be described with reference to FIGS. 27-37. As pointed out earlier, the network of the present invention is comprised of a single master site-based spectral reuse transceiver and one or more (usually a plurality of) remote site-based spectral reuse transceivers, with all communications being conducted only between the master site and the remote sites; there are no communications between remote sites.

As shown in the state diagram of FIG. 27, when a transceiver is powered up at state 271, the transceiver is in idle mode, waiting for a command or interprocessor communication (IPC) from its associated control processor, as to whether it is to operate as a master transceiver or remote site transceiver. Where the transceiver is to operate as a master, it transitions to state 272, and the master transceiver proceeds to conduct network initiation and supervisory actions, as will be described. Where it is to operate as a remote site, the transceiver transitions to state 273, wherein it conducts a 'join the network' routine with the master site transceiver. As will be described below, and as indicated by the 'search for join preamble' loop 274, this involves a search for a prescribed 'beacon preamble' burst (to be described), which is periodically transmitted by the master for the purpose of enabling remote sites who wish to join the network to do so. Once the remote site has joined the network, it transitions to state 275, wherein it now has the ability to exchange data messages with the master, when polled by the master, as will be described.

As noted above, in accordance with the present invention, all actions, including the assembly of the communication network itself, are initiated by the master site transceiver.

When the master site transceiver first comes up, it is the only member of the network. An initial task of the master is to determine whether there are any remote sites who wish to join the network, and then grant permission and enable such remote sites to become active network participants, thereby assembling the network for its intended use (e.g., telemetry from a plurality of transducer sites). Once one or more remote site transceivers have joined the network, the master may transmit messages to those remote sites, and may grant permission to the remote sites to transmit messages back to the master site. To this end, the master site employs the four message formats shown in FIGS. 28-31.

More particularly, FIG. 28 shows the contents of a 'beacon preamble' burst, that is periodically transmitted by the master for the purpose of stimulating a response from any remote site who wishes to join the network. To this end, the beacon preamble comprises a single carrier burst, a first portion 281 of which is pure carrier, which the master has determined after a scan of the spectrum of interest to be a clear channel. This clear channel carrier portion 281 is followed by a field 282 containing an alternating series of +/−b 1's, and terminated by a field 283, that contains a unique word specifically associated with a search for joining the network action. As will be described, in the course of scanning the (480) channels in (3 MHz) band of interest for the presence of activity, and detecting a beacon preamble, a remote site will proceed to transmit back to the master site a response burst containing only the carrier it has detected in the beacon preamble. The use of the carrier (which the master has previously determined to be a clear channel) in the beacon preamble ensures that the response by the remote site will not interfere with another user of the network.

FIG. 29 shows the contents of an initialization burst, which is transmitted by the master site to a remote site who is desirous of joining the network and has successfully responded to the master 'beacon preamble' shown in FIG. 28, described above. Because the remote site has no knowledge of any clear channel other than the channel on which the master's beacon preamble was transmitted, it continues to listen on that channel for a follow-up initialization message from the master site. The follow-up or beacon message of FIG. 29 is a single carrier message (the same clear channel which was detected by the remote site as the beacon of FIG. 28) containing a preamble 291 of pure carrier, which is followed by a field 292 of alternating +/−1's, an a unique word field 293, which is different from the unique word field 283. This is followed by a message field 294, which contains prescribed information that enables the remote site to join the network, including the clear channel map, the PN sequence used to hop through the clear channel map, the seed for the PN sequence and the preamble channel number. As the remote transceiver is not locked to the master site transceiver, this last item ensures that the remote will properly identify the number of the channel on which it has responded to the master, and thereby enable the remote site to properly use the clear channel map for messaging.

FIG. 30 shows the configuration of a standard data message burst used for the transmission of information between a master site and a remote site (other than initialization of the remote site, as described above, with reference to FIGS. 28 and 29). In particular, a data message burst contains a single channel preamble, an initial portion 301 of which is pure carrier, followed by an alternating series of +/−1's 302, and being terminated by a unique word field 303, that is different from the unique word fields of the message formats of FIGS. 28 and 29. The preamble, which may typically be on the order of several tens (e.g., 48) of symbols, is followed by a multi-carrier data field 304 of N symbols in length.

FIG. 31 shows the format of a 'tickler' burst. Respectively different sets of clear channels are used as tickler tones sets by the master site transceiver to initiate a prescribed response in a remote site transceiver, and by the remote site transceiver to initiate a response in the master site transceiver. In particular, as will be described, the master site transceiver may transmit a 'media open' tickler tone set to indicate that the network is available for the transmission of messages from a remote site transceiver to the master site; an 'access grant' tickler tone set granting access to the network to the first in time, access-requesting remote site transceiver; and a 'master access' tickler tone set to indicated to the network that the master site transceiver is about to broadcast a message. A remote site transceiver may transmit an 'access request' tone set. This tone set is transmitted by a remote site having data to transmit to the master site transceiver, after the expiration of a random delay period following detection of the media open tickler tone set from the master site transceiver. Tickler tones may be comprised of sets of multiple frequencies (e.g., from three to five frequencies) extracted from the clear channel list and are transmitted simultaneously over a prescribed symbol span, e.g., on the order of four to five symbols.

Figure 32:
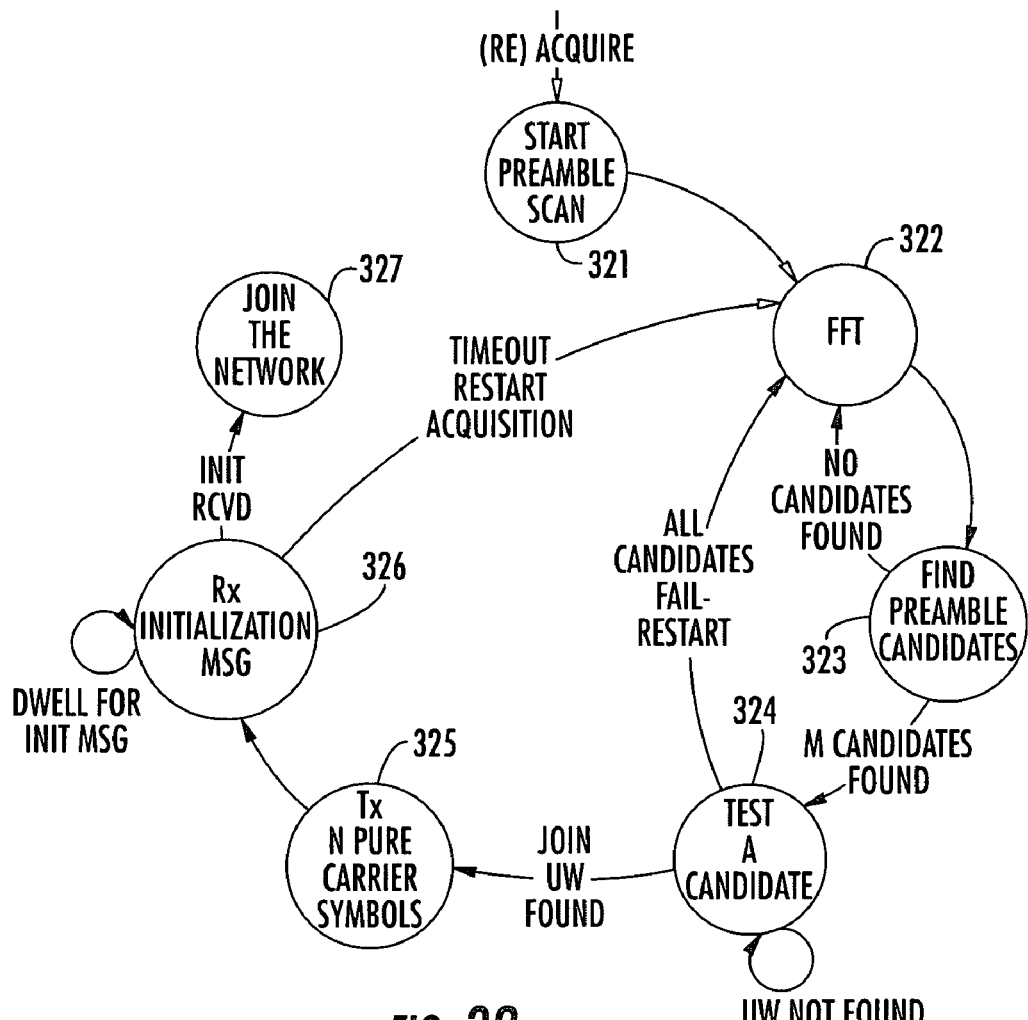
FIG. 32 is a state diagram illustrating the manner in which a remote site transceiver 'joins' (or reacquires) the network.

Attention is now directed to FIG. 32, which is a state diagram illustrating the manner in which a remote site transceiver may either join or reacquire the network. As shown therein, and as described above with reference to the master's 'beacon preamble' burst format shown in FIG. 28, the master periodically transmits a 'beacon preamble', successful detection of which enables a remote site to join the network. To this end, in state 321, when a remote site is brought up or enabled by its control processor, it conducts a scan of the spectrum of interest for the presence of energy. As it scans the (480) channels it couples the received frequency energy information to its FFT in state 322. The outputs of the FFT are then examined in state 323 for the presence of potential candidates of a possible beacon preamble. Discriminating factors include the length of the burst (it being noted that a beacon preamble may be on the order of forty-eight symbols in length, so that a burst on the order of forty-five to fifty symbols would make a good candidate), whether or not the detected energy was periodically received, and the power level of the received burst relative to other (data-conveying) carriers (a pure carrier containing a larger amount of energy than a data-bearing carrier).

Once the FFT has been examined and one or more carriers have been found, the received carriers are downconverted to baseband and examined in state 324 one at a time for the presence of the unique word associated with a beacon preamble, referenced above. If no candidate contains the prescribed unique word, the transceiver transitions back to state 322. If the proper unique word is found, however, the remote transceiver transitions to state 325, wherein it transmits back to the master site a response burst containing only the carrier it has detected in the beacon preamble, as noted above, the use of the carrier in the beacon preamble ensures that the response by the remote site will not interfere with another user of the network.

After transmitting the beacon carrier back to the master site transceiver, the remote site transceiver transitions to step 326, wherein it looks for the master to transmit the beacon burst of FIG. 29. If the beacon burst of FIG. 29 is received from the master within a prescribed time-out window, the transceiver transitions to state 327 wherein it joins the network. As described above, the message field of the beacon burst from the master site contains prescribed information that enables the remote site to join the network, including the clear channel map, the PN sequence used to hop through the clear channel map, the seed for the PN sequence and the preamble channel number. On the other hand, if the beacon burst is not received from the master within the time-out window, the transceiver transitions to back to state 322.

As noted earlier, the preamble portion of a burst transmitted from the master site transceiver contains power from only a single carrier—making it the ideal time to conduct clear channel assessment (CCA), namely, the ideal time for each remote unit in the network to monitor the 3 MHz frequency band of interest (e.g., here the 217-220 MHz band) for the presence of energy (sourced from primary users). During the preamble, after received signal strength indication and frequency offset computations, most of the remaining preamble is used for symbol timing recovery. Therefore, during this initial time (until unique word processing begins), the primary goal of each unit's control processor is to monitor the 480-6.25 KHz channels in the 217-220 MHz band for the presence of interferers (primary users and others). Twenty-four to thirty-two symbols are available in each burst for clear channel assessment.

Clear channel assessment is performed at both the master site and at each of the remote sites and serves to maintain a current list of non-interfering (clear) channels at the master site and distributed to all remote sites in the network. By transmitting on only a clear channel, a respective site is ensured that it will not interfere with any primary user of the spectrum of interest.

Figure 33:
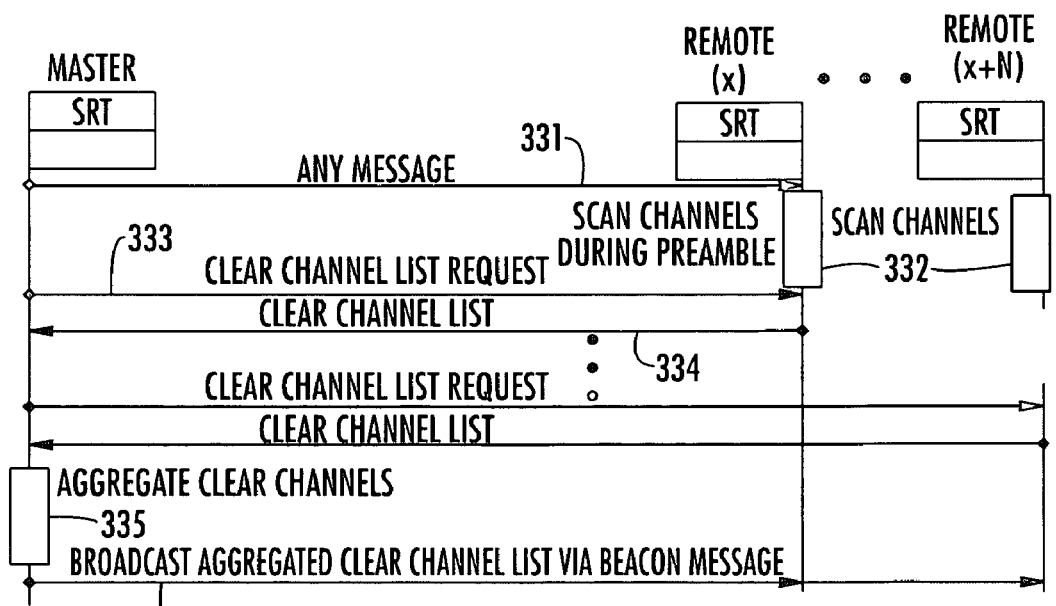
FIG. 33 is a sequence diagram of a clear channel assessment routine through which a master node maintains and distributes an aggregate list of clear channels.

FIG. 33 is a sequence diagram of the methodology through which the master site maintains and distributes this aggregate list of clear channels to all the remote sites in the network. When not transmitting a message to the master, each remote user is sequentially stepping through and monitoring its current list of clear channels (that it has previously obtained from the master unit), in accordance with a pseudo random hopping sequence known a priori by all the users of the network for a message that may be transmitted to it by the master site transceiver.

During the preamble period of any message being transmitted by the master at step 331, each remote node's transceiver scans all 480-6.25 KHz frequency bins within the 217-220 MHz spectrum for the presence of energy at step 332. Any bin containing energy above a prescribed threshold is masked as a non-clear channel, while the remaining ones of the 480 possible channels are marked as clear channels.

With each remote site transceiver having generated a clear channel list as a result of preamble scanning step 332, the master transceiver then sequentially interrogates each remote in the network for its clear channel list via a clear channel request message in step 333. In response to receiving a clear channel request message, a respective remote site transceiver transmits back to the master channel at step 334 the clear channel list it obtained during the preamble portion of the master's message. The master site transceiver continues to sequentially interrogate each of the remote site transceivers, via subsequent clear channel list requests, until it has completed interrogation of the last remote site.

In step 335, the master site transceiver logically combines all of the clear channel lists from all the interrogated remote transceivers to produce an 'aggregate' clear channel list. This aggregate clear channel list is stored in the master transceiver and broadcast in step 336 to all of the remote transceivers. The aggregate clear channel list is broadcast to the remotes using the normal multi-carrier hopping transmission (not single-carrier). Only the initialization (beacon) message is transmitted on a single carrier. As the aggregate clear channel list is received at a respective remote site transceiver it is stored in memory.

As noted earlier, remote site transceivers are configured to conduct communications only with the master site. The master site employs an omnidirectional antenna, while the remote sites use directional antennas aimed at the master site. Communications are of two types: 1—the remote site has data to transmit and is awaiting permission from the master site to transmit that data to the master site; and 2—the master site has a message to transmit to a remote site. For the former type of communication, the master makes the network or media 'open' to the first remote site transceiver to request access to the network in accordance with a prescribed 'random backoff' arbitration scheme. For the latter, the master broadcasts a prescribed 'master access' tickler burst.

Figure 34:
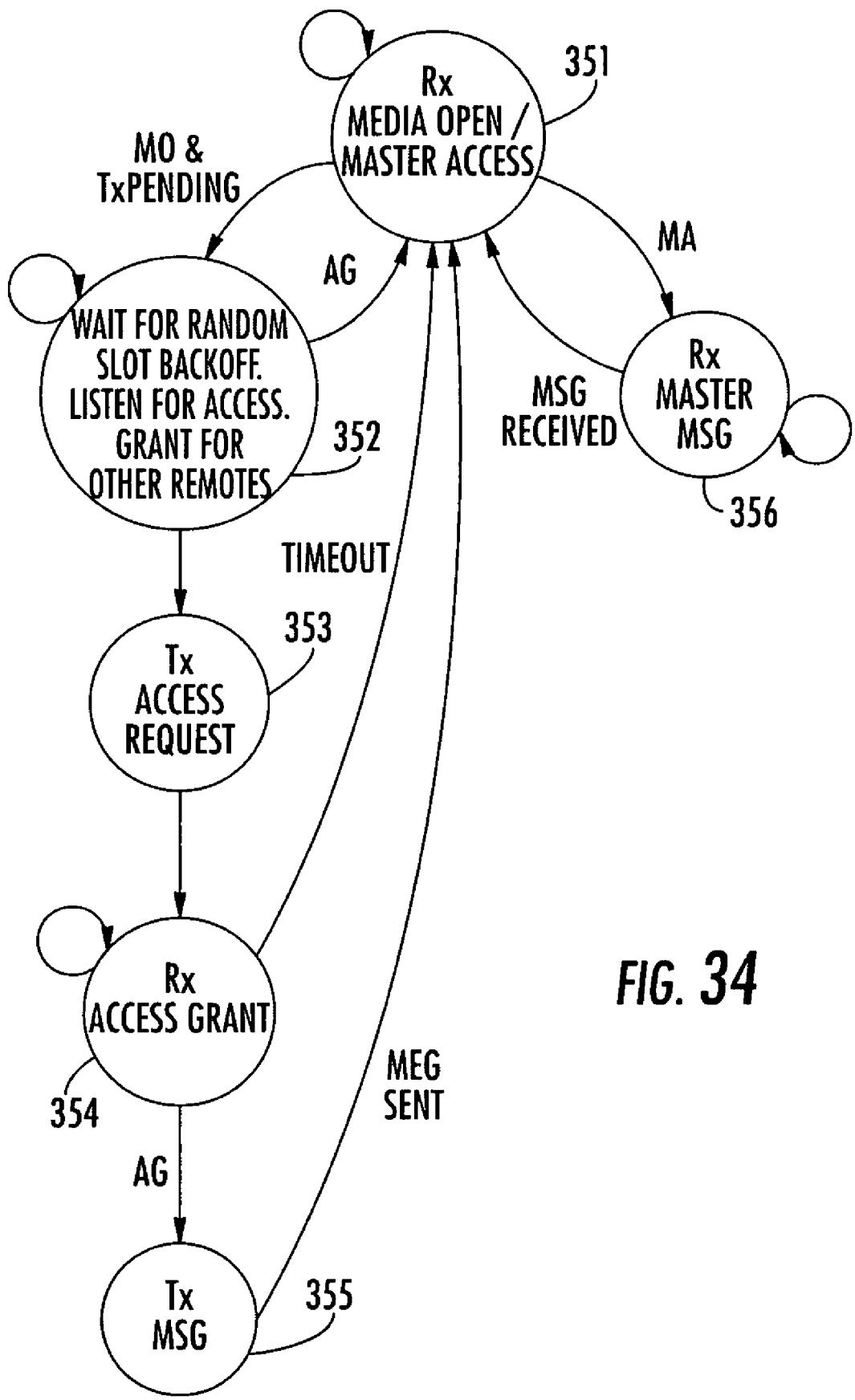
FIG. 34 is a state diagram associated with the operation of a remote site transceiver.
Figure 35:
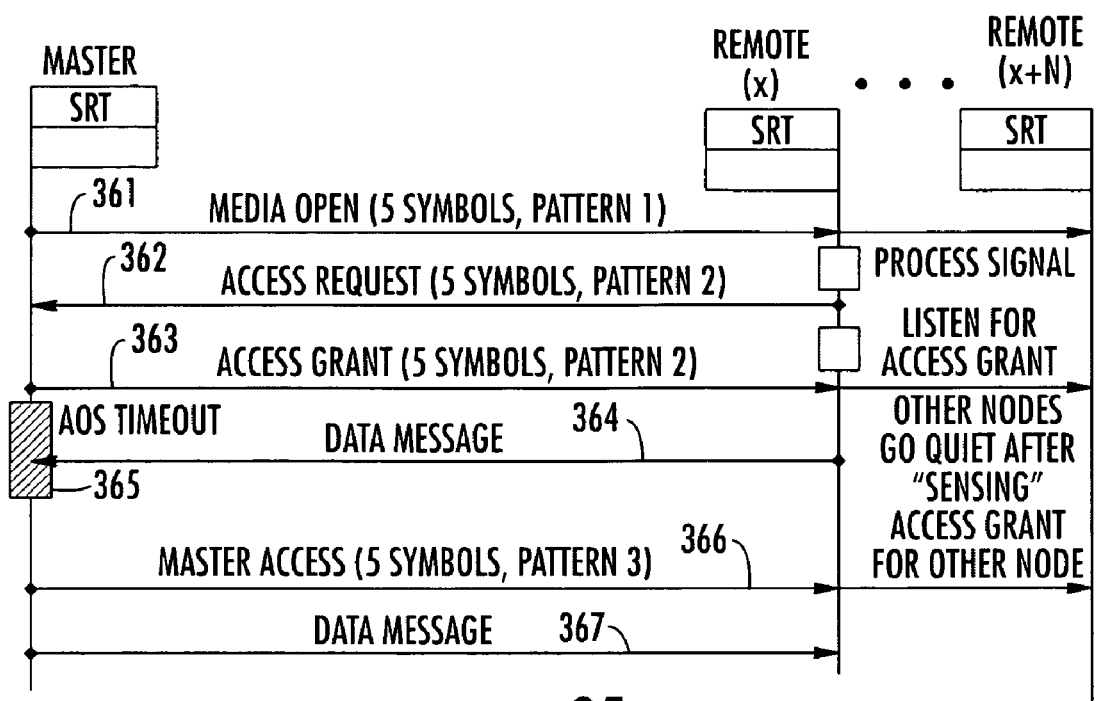
FIG. 35 is a sequence diagram associated with the state diagram of FIG. 34.
Figure 36:
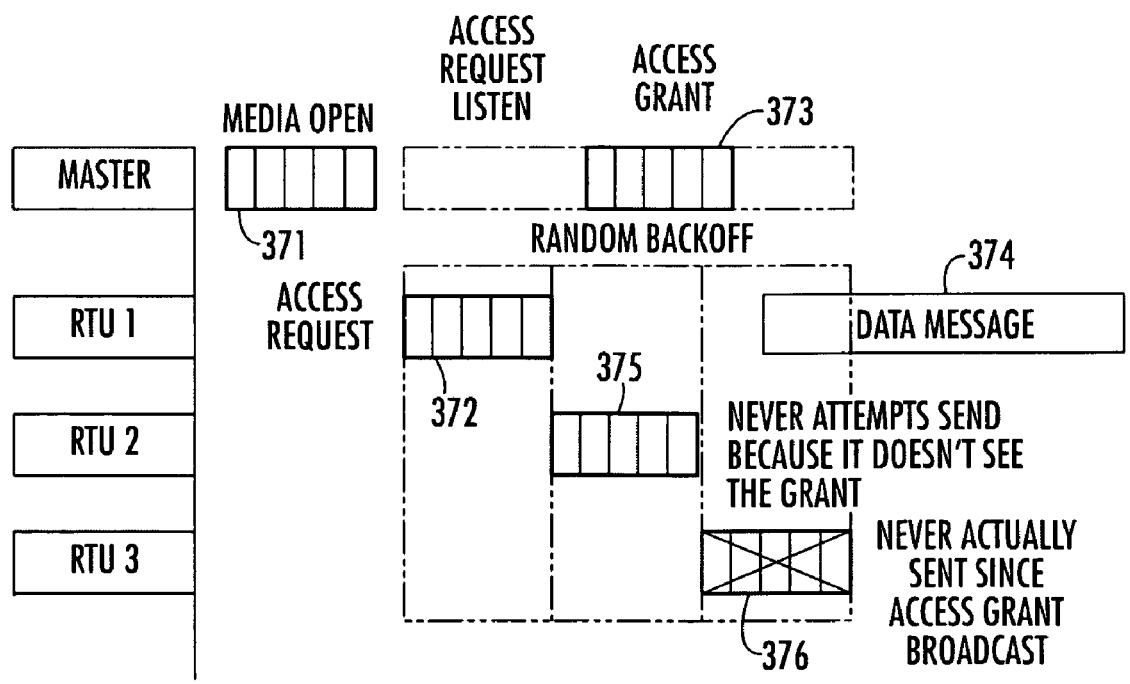
FIG. 36 is a contention and backoff diagram associated with the sequence diagram of FIG. 35.

The communication routine for the case that the remote site has data to transmit and is awaiting permission from the master site to transmit that data (to the master site transceiver) may be readily understood by reference to the state and sequence diagrams of FIGS. 34, 35 and 36. From an initial state 351 the remote site transitions to state 352 as it desires access to the network. In order to indicate that the network media is 'open' for message requests, the master site transceiver transmits a 'media open' tickler, shown at 361 in FIG. 35 and 371 in FIG. 36.

As shown at 371 in the contention and backoff diagram of FIG. 36, each remote site transceiver with a pending message awaiting transmission will respond through a random slotted back off, before transmitting an access request—corresponding to the access request transmission 353 in the state diagram of FIG. 34, the tickler 362 in FIG. 35, and the access request 372 in the sequence diagram of FIG. 36. Thereafter, the requesting remote transceiver waits for the master site to transmit an 'access grant' tickler, as shown at 363 in FIG. 35 and 373 in FIG. 36. Once a remote node has been granted access to the channel, as shown at state 354 in the state diagram of FIG. 34, the master node listens for a transmission (state 355 in the state diagram of FIG. 34) from the remote node (data message 364 in FIG. 35 and data message 373 in FIG. 36) for a period of time shown as an acquisition of signal (AOS) timeout period 265 in FIG. 35.

Figure 37:
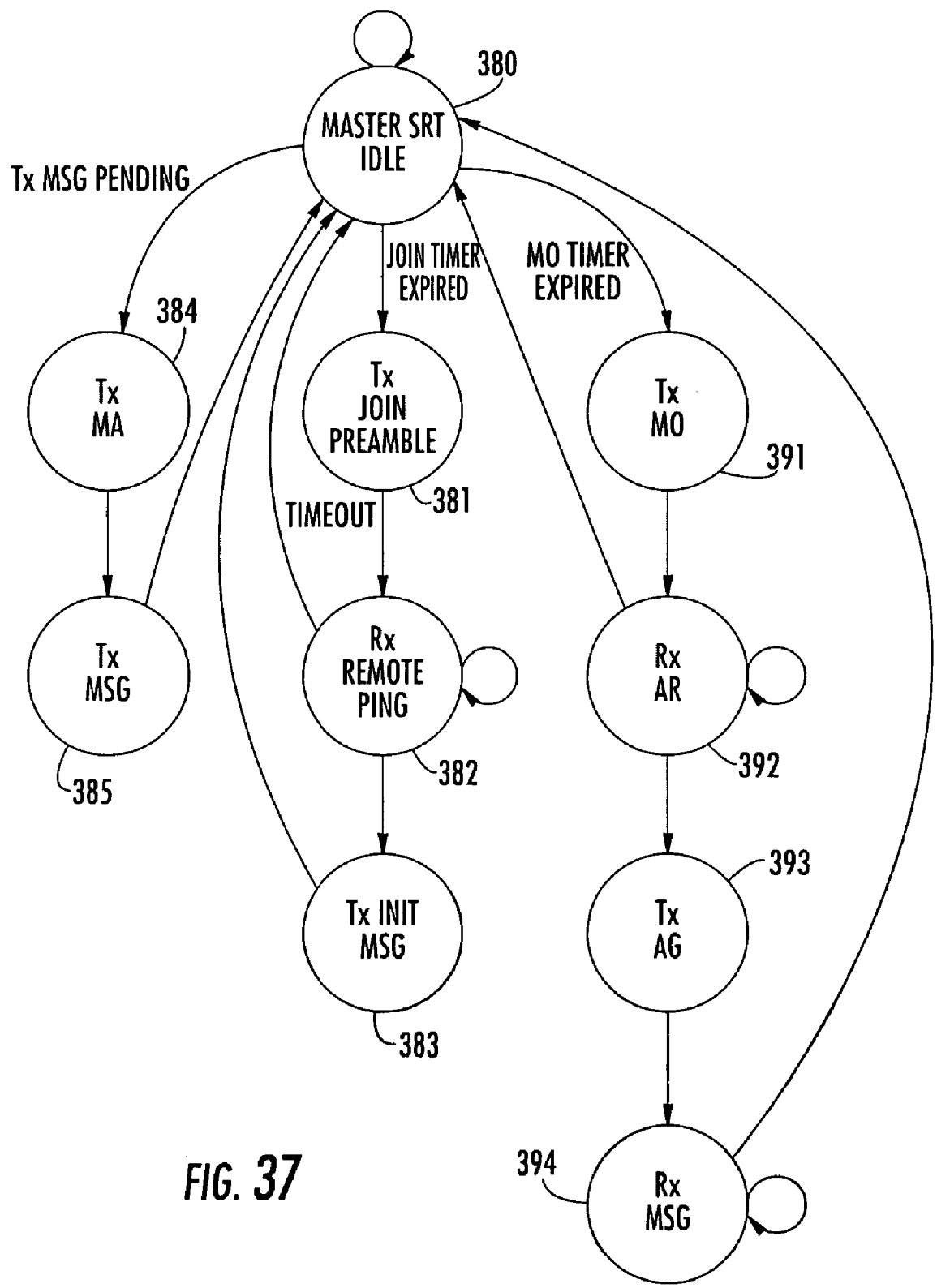
FIG. 37 is a state diagram associated with the operation of a master site transceiver.

In the contention and backoff diagram of FIG. 37, it can be seen that remote transceiver RTU2 will not attempt to send a data message, since it will not detect an access grant, as the access grant 373 from the master is transmitted at the same time that remote transceiver RTU2 is transmitting an access request. Remote transceiver RTU3 never attempts to send an access request, because it sees an access grant being transmitted by the master prior to RTU 3 initiating an access request, so that RTU3 knows that the access grant from the master site is intended for another remote transceiver.

Where the master site transceiver transmits a data message to a remote site, it transmits a prescribed master access tickler as shown at 366 in FIG. 35. In response to this tickler, the remote site transceiver transitions from state 351 to state 356 in the state diagram of FIG. 34. This is followed by the master site transceiver transmitting a message at 367 in FIG. 35, which is received in state 356 in the state diagram of FIG. 34.

The manner in which the master site communicates with remote sites may be readily understood by reference to the state diagram of FIG. 37. As shown therein the master site is initially in an idle state 350. In this state the master site transceiver is repetitively scanning the (480) frequency bins of the (3 MHz) bandwidth of interest, in order to update its clear channel list. It also uses a prescribed periodic timeout that controls the rate at which the master site transmits the beacon preamble of FIG. 28 (step 381) for the purpose of allowing remote transceivers to join the network. It then transitions to step 382 wherein it listens for a response from any remote to the transmitted beacon preamble. If there is no response within a prescribed time-out window, the master transceiver transitions back to state 380. However, if a remote site transceiver response is received, the master site transceiver transitions to state 383, wherein it transmits the initialization beacon of FIG. 29. The master site transceiver then transitions back to state 380.

If, when in idle state 380, the master site transceiver has a data message awaiting transmission, it transitions to state 384 wherein it transmits the master access tickler 366 of FIG. 35. The master site transceiver then transitions to state 385 and transmits the data message, as shown at 367 in FIG. 35. It then returns to the idle state 380.

In addition to enabling remote site transceivers to join the network and transmitting messages to remote site transceivers, the master site is also controllably enabled to allow remote site transceivers to transmit data messages to it. For this purpose, as described above, the master site transceiver transmits a media open tickler as shown at 361 in FIG. 35. In order to control when the media open tickler is transmitted, a media open time-out is employed for the case that the master site is in the idle state. When the media timeout tickler expires, the master site transceiver transitions to state 391, wherein it transmits the media open tickler. It then transitions to state 392 and looks for the return of an access request tickler from a remote site transceiver, as shown at 362 in FIG. 35 and 372 in FIG. 36.

If no access request tickler is received within a prescribed time-out, the master transceiver transitions back to state 380. On the other hand, where an access request tickler is received, the master transceiver transitions to state 393, wherein it transmits an access grant tickler, as shown at 363 in FIG. 35 and 373 in FIG. 36. It then transitions to state 394, wherein it receives the data message from the remote transceiver to whom transmission access of the network has been granted, as shown at 364 in FIG. 35 and 374 in FIG. 36. Once the data message has been received or a prescribed time-out expires, the master transceiver transitions back to idle state 380.

As will be appreciated from the foregoing description, the problem of how to allocate secondary usage of a licensed radio frequency band, so as not to interfere with other users (licensed primary and secondary users), is successfully addressed in accordance with the present invention by means of a novel spectral reuse transceiver and an associated spectral activity-based link utilization control mechanism, that employ a selectively filtered form of orthogonal frequency division multiplexing to produce a sub-set of non-interfering radio channels.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of conducting communications between respective transceivers of a communication network using a selected portion of a prescribed communication bandwidth containing a plurality of sub-bandwidth communication channels, said method comprising the steps of:
   (a) monitoring said prescribed communication bandwidth for the presence of communication activity on said sub-bandwidth communication channels, and identifying those ones of said sub-bandwidth communication channels which are absent communication activity as clear channels available for use by said respective transceivers; and
   (b) causing said respective transceivers to conduct communications therebetween using selected ones of said clear channels identified in step (a) and processing identifications of clear channels within a modulated filter bank containing an inverse fast Fourier transform operator and a polyphase filter, and deriving therefrom a plurality of carrier frequencies respectively corresponding to said selected ones of said clear channels;
   wherein said communication network contains a master site transceiver and a plurality of remote site transceivers, and wherein communications within said network are between said master site transceiver and said remote site transceivers; and
   wherein step (a) comprises the steps of: (a1) causing said master site transceiver to transmit a prescribed message that is detectable by each of said remote site transceivers and, in response to said prescribed message, causing each remote site transceiver to monitor said prescribed communication bandwidth for effective communication activity on said sub-bandwidth communication channels, and to identify which of said sub-bandwidth communication channels appear to said each remote site transceiver to be absent effective communication activity and thereby constitute clear channels available for use,
   (a2) causing each remote site transceiver to transmit to said master site transceiver a message identifying clear channels identified thereby in step (a1), and
   (a3) causing said master site transceiver to broadcast to each of said remote site transceivers a communication control message containing an aggregate identification of clear channels based upon clear channel identifying messages transmitted by said remote site transceivers to said master site transceiver in step (a2).

2. The method according to claim 1, wherein step (b) comprises causing said transceivers to conduct communications therebetween by sequentially using respectively different ones of said selected ones of said clear channels identified in step (a).

3. The method according to claim 1, wherein step (a1) comprises causing said master site transceiver to transmit a predetermined preamble as part of said prescribed message, said predetermined preamble being monitored by each of said remote site transceivers and, in response to said predetermined preamble, causing each remote site transceiver to monitor said prescribed communication bandwidth for effective communication activity on said sub-bandwidth communication channels, and to identify which of said sub-bandwidth communication channels appear to said each remote site transceiver to be absent effective communication activity and thereby constitute clear channels available for use.

4. The method according to claim 1, wherein said communication control message broadcast by said master site transceiver contains information representative of a sequence of respectively different ones of said clear channels as broadcast in step (a3) that are to be sequentially employed for conveying messages between said master site transceiver and said remote site transceivers.

5. The method according to claim 1, wherein step (b) comprises causing said transceivers to conduct communications therebetween by using differential quadrature phase shift keying modulation of sequential ones of respectively different ones of said clear channels identified in step (a).

6. The method according to claim 1, wherein said prescribed communication bandwidth is a 217 to 220 MHz band, and wherein a respective sub-bandwidth communication channel is a 6.25 KHz wide channel.

7. A system for conducting communications between respective sites of a communication network using a selected portion of a prescribed communication bandwidth containing a plurality of sub-bandwidth communication channels, said system comprising:
   a master site transceiver and a plurality of remote site transceivers, each remote site transceiver being operative to monitor said prescribed communication bandwidth for the presence of communication activity on said sub-bandwidth communication channels, and to inform said master site transceiver which of said sub-bandwidth communication channels are absent communication activity and therefore constitute clear channels available for use by said system; wherein each of said master site transceiver and said remote site transceivers is operative to couple identifications of selected ones of said clear channels to a modulated filter bank containing an inverse fast Fourier transform operator and a polyphase filter so as to derive therefrom a plurality of carrier frequencies respectively corresponding to said selected ones of said clear channels;
   said master site transceiver being operative to compile an aggregate list of clear channels identified by said plurality of remote site transceivers and to transmit a message to said plurality of remote site transceivers containing information representative of said aggregate list of clear channels; and
   wherein said master site transceiver and a remote site transceiver are operative to conduct communications therebetween using said selected ones of said clear channels contained in said aggregate list.

8. The system according to claim 7, wherein said master site transceiver and said remote site transceiver are operative to conduct communications therebetween by sequentially using respectively different ones of said selected ones of said clear channels contained in said aggregate list.

9. The system according to claim 8, wherein said master site transceiver is operative to transmit a message that is detectable by each of said remote site transceivers and wherein, in response to said message, each remote site transceiver is operative to monitor said prescribed communication bandwidth for effective communication activity on said sub-bandwidth communication channels, and to identify which of said sub-bandwidth communication channels appear to said each remote site transceiver to be absent effective communication activity and thereby constitute said clear channels available for use.

10. The system according to claim 7, wherein said master site transceiver and said remote site transceiver are operative to conduct communications therebetween using differential quadrature phase shift keying modulation of sequential ones of respectively different ones of said clear channels.

11. The system according to claim 7, wherein said prescribed communication bandwidth is a 217 to 220 MHz band, and wherein a respective sub-bandwidth communication channel is a 6.25 KHz wide channel.

12. A method of conducting communications between transceivers of a communication network, using a selected portion of a prescribed communication bandwidth containing a plurality of sub-bandwidth communication channels, said method comprising the steps of:
   (a) at a master site transceiver, transmitting a clear channel assessment message that is detectable by each of remote site transceivers;
   (b) at each remote site transceiver, receiving said clear channel assessment message and, in response thereto, scanning said prescribed communication bandwidth for effective communication activity on said sub-bandwidth communication channels, and identifying which of said sub-bandwidth communication channels appear to said each remote site transceiver to be absent effective communication activity and thereby constitute clear channels available for use;
   (c) at each remote site transceiver, transmitting a message to said master site transceiver containing information from which said clear channels may be identified at said master site transceiver and coupling identifications of selected ones of said clear channels identified to a modulated filter bank containing an inverse fast Fourier transform operator and a polyphase filter, and deriving therefrom a plurality of carrier frequencies respectively corresponding to said selected ones of said clear channels;
   (d) at said master site transceiver receiving messages transmitted from remote sites in step (c), compiling an aggregate list of clear channels as identified in said received messages, and transmitting to each remote site transceiver a clear channel usage message representative of said aggregate list; and
   (e) causing said master site and a remote site transceiver to conduct communications therebetween using said selected ones of said clear channels of said aggregate list.

13. The method according to claim 12, wherein step (e) comprises causing said master site transceiver and said remote site transceiver to conduct communications therebetween by sequentially using respectively different ones of said selected ones of said clear channels of said aggregate list.

14. The method according to claim 13, wherein said clear channel usage message transmitted by said master site transceiver contains information representative of a sequence of respectively different ones of said clear channels that are to be sequentially used for conveying messages between said master site transceiver and said remote site transceiver.

15. The method according to claim 12, further comprising the step (f) of conducting a prescribed message exchange between said master site transceiver and a remote site desiring to join said communication network, in order to enable said remote site desiring to join said communication network to participate with said master site in steps (a)-(e).

16. The method according to claim 15, wherein step (f) comprises:
   (f1) transmitting, from said master site transceiver, a beacon preamble message containing a clear channel and a unique word exclusively associated with said beacon preamble message;
   (f2) at said remote site transceiver desiring to join said communication network, in response to detection of said beacon preamble message, transmitting a pure carrier signal corresponding to the clear channel contained in said beacon preamble message transmitted from said master site in step (a); and
   (f3) at said master site transceiver, in response to detecting said pure carrier signal transmitted by said remote site transceiver desiring to join said communication network in step (f2), transmitting an initialization message containing said clear channel, a unique word exclusively associated with said initialization message, and initialization information that will enable said remote site desiring to join said communication network to join said communication network.

17. The method according to claim 12, wherein step (e) comprises the steps of:
 (e1) broadcasting, from said master site transceiver, a media open message comprised of a prescribed plurality of clear channel frequencies;
 (e2) at a remote site transceiver having information to be transmitted to said master site transceiver, in response to detecting said media open message broadcast from said master site transceiver in step (e1), and after expiration of a random delay interval, transmitting an access request message containing a predetermined plurality of clear channel frequencies different from said prescribed plurality of clear channel frequencies;
 (e3) at said master site transceiver, in response to receipt of an access request message, broadcasting an access grant message containing a predefined number of clear channel frequencies different from said prescribed plurality and predetermined plurality of clear channel frequencies;
 (e4) at said remote site transceiver having information to be transmitted to said master site transceiver, in response to detecting said access grant message broadcast from said master site transceiver in step (e1), transmitting a data message containing said information.

18. The method according to claim 12, wherein step (e) comprises the steps of:
 (e1) broadcasting, from said master site transceiver, a media access message comprised of a prescribed plurality of clear channel frequencies;
 (e1) broadcasting, from said master site transceiver, a data message containing information intended for a remote site transceiver
 (e2) at said remote site transceiver, in response to detecting said media access message broadcast from said master site transceiver in step (e1), monitoring said communication network and receiving said data message broadcast from said master site transceiver in step (e1).

* * * * *